United States Patent
Kono

(10) Patent No.: US 6,276,434 B1
(45) Date of Patent: *Aug. 21, 2001

(54) METHOD AND APPARATUS FOR MANUFACTURING METALLIC PARTS BY INK INJECTION MOLDING FROM THE SEMI-SOLID STATE

(75) Inventor: Kaname Kono, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,048

(22) Filed: Jun. 11, 1999

Related U.S. Application Data

(63) Continuation of application No. 09/160,330, filed on Sep. 25, 1998.
(60) Provisional application No. 60/080,078, filed on Mar. 31, 1998.

(51) Int. Cl.[7] ............................. B22D 17/00; B22D 17/10
(52) U.S. Cl. ............................................ 164/312; 164/900
(58) Field of Search .................................. 164/900, 71.1, 164/113, 312; 425/557, 561

(56) References Cited

U.S. PATENT DOCUMENTS

| | | |
|---|---|---|
| 2,386,966 | 10/1945 | MacMillan . |
| 2,505,540 | 4/1950 | Goldhard . |
| 2,529,146 | 11/1950 | Feitl . |

(List continued on next page.)

FOREIGN PATENT DOCUMENTS

| | | |
|---|---|---|
| 196 11 419 | 9/1996 | (DE) . |
| 0 476 843 | 3/1992 | (EP) . |
| 0 761 344 | 3/1997 | (EP) . |
| 1166874 | 6/1989 | (JP) . |
| 1-178345 | 7/1989 | (JP) . |
| 2-274360 | 11/1990 | (JP) . |
| 5-008017 | 1/1993 | (JP) . |
| 5-285626 | 11/1993 | (JP) . |
| 5-285627 | 11/1993 | (JP) . |
| 6-306507 | 11/1994 | (JP) . |
| 7-51827 | 2/1995 | (JP) . |
| 8-72110 | 3/1996 | (JP) . |
| 8-252661 | 10/1996 | (JP) . |
| 9-155524 | 6/1997 | (JP) . |
| 9-155527 | 6/1997 | (JP) . |
| 9-295122 | 11/1997 | (JP) . |
| 97/21509 | 6/1997 | (WO) . |
| 97/45218 | 12/1997 | (WO) . |
| 99/28065 | 6/1999 | (WO) . |

OTHER PUBLICATIONS

Flemings et al., "Rheocasting," *Materials Science and Engineering,* vol. 25 (1976), pp. 103–117.

Worthy, "Injection Molding of Magnesium Alloys," *Chemical & Engineering News,* Jun. 1988, pp. 29–30.

Tissier et al., "Magnesium rheocasting: a study of processing–microstructure interactions," *Journal of Materials Science,* vol. 25 (1990), pp. 1184–1196.

Carnahan et al., "New Manufacturing Process for Metal Matrix Composite Synthesis," *Fabrication of Particulates Reinforced Metal Composites, Proceedings of an International Conference,* Sep. 1990, pp. 101–105.

(List continued on next page.)

*Primary Examiner*—Kuang Y. Lin
(74) *Attorney, Agent, or Firm*—Foley & Lardner

(57) ABSTRACT

An injection molding system includes a feeder in which a metal is melted and a first chamber into which a desired amount of melted metal is introduced. A piston in a second chamber first retracts to create suction, assisting in drawing in the melted metal into the second chamber from the first chamber and evacuating gas. A ram then pushes some melted metal remaining in the first chamber into the second chamber, forcing out gas present in the second chamber. The piston then injects the melted metal out of the second chamber into a mold. The melted metal is maintained in a semi-solid state prior to injection into the mold.

34 Claims, 24 Drawing Sheets

U.S. PATENT DOCUMENTS

| | | |
|---|---|---|
| 2,785,448 | 3/1957 | Hodler . |
| 3,048,892 | 8/1962 | Davis, Jr. et al. . |
| 3,106,002 | 10/1963 | Bauer . |
| 3,189,945 | 6/1965 | Strauss . |
| 3,201,836 | 8/1965 | Nyselius . |
| 3,254,377 | 6/1966 | Morton . |
| 3,268,960 | 8/1966 | Morton . |
| 3,270,383 | 9/1966 | Hall et al. . |
| 3,319,702 | 5/1967 | Hartwig et al. . |
| 3,344,848 | 10/1967 | Hall et al. . |
| 3,447,593 | 6/1969 | Nyselius et al. . |
| 3,550,207 | 12/1970 | Strauss . |
| 3,693,702 | 9/1972 | Piekenbrink et al. . |
| 3,773,873 * | 11/1973 | Spaak et al. .......................... 425/577 |
| 3,810,505 | 5/1974 | Cross . |
| 3,814,170 | 6/1974 | Kahn . |
| 3,874,207 | 4/1975 | Lemelson . |
| 3,893,792 | 7/1975 | Laczko . |
| 3,902,544 | 9/1975 | Flemings et al. . |
| 3,936,298 | 2/1976 | Mehrabian et al. . |
| 3,976,118 | 8/1976 | Kahn . |
| 4,049,040 | 9/1977 | Lynch . |
| 4,088,178 | 5/1978 | Ueno et al. . |
| 4,168,789 | 9/1979 | Deshais et al. . |
| 4,212,625 | 7/1980 | Shutt . |
| 4,287,935 | 9/1981 | Ueno et al. . |
| 4,330,026 | 5/1982 | Fink . |
| 4,347,889 | 9/1982 | Komatsu et al. . |
| 4,434,839 | 3/1984 | Vogel . |
| 4,436,140 | 3/1984 | Ebisawa et al. . |
| 4,473,103 | 9/1984 | Kenney et al. . |
| 4,476,912 | 10/1984 | Harvill . |
| 4,510,987 | 4/1985 | Collot . |
| 4,534,403 | 8/1985 | Harvill . |
| 4,537,242 | 8/1985 | Pryor et al. . |
| 4,559,991 | 12/1985 | Motomura et al. . |
| 4,586,560 | 5/1986 | Ikeya et al. . |
| 4,687,042 | 8/1987 | Young . |
| 4,694,881 | 9/1987 | Busk . |
| 4,694,882 | 9/1987 | Busk . |
| 4,730,658 | 3/1988 | Nakano . |
| 4,771,818 | 9/1988 | Kenney . |
| 4,828,460 | 5/1989 | Saito et al. . |
| 4,884,621 | 12/1989 | Ban et al. . |
| 4,898,714 * | 2/1990 | Urban et al. ......................... 425/557 |
| 4,952,364 * | 8/1990 | Matsuda et al. ..................... 425/562 |
| 4,997,027 | 3/1991 | Akimoto . |
| 5,040,589 | 8/1991 | Bradley et al. . |
| 5,143,141 | 9/1992 | Frulla . |
| 5,144,998 | 9/1992 | Hirai et al. . |
| 5,161,598 | 11/1992 | Iwamoto et al. . |
| 5,181,551 | 1/1993 | Kidd et al. . |
| 5,186,236 | 2/1993 | Gabathuler et al. . |
| 5,205,338 | 4/1993 | Shimmell . |
| 5,244,033 | 9/1993 | Ueno . |
| 5,375,645 | 12/1994 | Brueker et al. . |
| 5,380,187 | 1/1995 | Fujikawa . |
| 5,394,931 | 3/1995 | Shiina et al. . |
| 5,501,266 | 3/1996 | Wang et al. ......................... 164/900 |
| 5,531,261 | 7/1996 | Yoshida et al. . |
| 5,533,562 | 7/1996 | Moschini et al. . |
| 5,571,346 | 11/1996 | Bergsma . |
| 5,575,325 | 11/1996 | Sugiura et al. . |
| 5,577,546 | 11/1996 | Kjar et al. . |
| 5,601,136 | 2/1997 | Shimmell . |
| 5,622,216 | 4/1997 | Brown . |
| 5,623,984 | 4/1997 | Nozaki et al. . |
| 5,630,463 | 5/1997 | Shimmell . |
| 5,630,466 | 5/1997 | Garat et al. . |
| 5,638,889 | 6/1997 | Sugiura et al. . |
| 5,657,812 | 8/1997 | Walter et al. . |
| 5,662,159 | 9/1997 | Iwamoto et al. . |
| 5,664,618 | 9/1997 | Kai et al. . |
| 5,665,302 | 9/1997 | Benni et al. . |
| 5,680,894 | 10/1997 | Kilbert . |
| 5,685,357 | 11/1997 | Kato et al. . |
| 5,697,422 | 12/1997 | Righi et al. . |
| 5,697,425 | 12/1997 | Nanba et al. . |
| 5,701,942 | 12/1997 | Adachi et al. . |
| 5,716,467 | 2/1998 | Marder et al. . |
| 5,730,198 | 3/1998 | Sircar . |
| 5,730,202 | 3/1998 | Shimmell . |
| 5,735,333 | 4/1998 | Nagawa . |
| 5,770,245 * | 6/1998 | Takizawa et al. ................... 425/557 |
| 5,839,497 * | 11/1998 | Fujino et al. ....................... 164/113 |

OTHER PUBLICATIONS

Pasternak et al., "Semi–Solid Production Processing of Magnesium Alloys by Thixmolding," *Proceedings of the Second International Conference on the Semi–Solid Proceeding of Alloys and Composites,* Jun. 1992, pp. 159–169.

Staff Report, "Semi–Solid Metalcasting Gains Acceptance, Applications," Foundry Management & Technology, Nov. 1995 pp. 23–26.

R.D. Carnalman et al., "Advances in thismolding", 52nd Annual World Magnesium Conference, May 17–19, 1994.

R.D. Carnahan et al., "New Manufacturing Process for Metal Matrix Composite Synthesis".

"Plastic Processing Technology Book", Published in Japan.

"Advertisement for Sodick Tupal Injection Machine", May 1997 and "Sodick Advertising Material" (no date) and English Translations.

Sodick, Seminar Material, Japan, Jul. 1995, by M. Fujikawa and English Translations.

"Semi–Solid Metalcasting", Foundry Management and Technology, Japan, Nov. 1995.

"Injection Molding of Magnesium Alloys", Chemical Engineering News, Jun. 6, 1988.

R. Mehrabian et al., "Casting in the Liquid–Solid Region," New Trend in Materials Processing, Papers presented at a seminar of AST, Oct. 19 and 20, 1974, ASM, 98–127 (1974).

M. Suery et al., "Effect of Strain Rate on Deformation Behavior of Semi–Solid Dendritic Alloys," *Metall. Trans. A.,* vol. 13A, No. 10: 1809–1819 (1982).

M.C. Flemings et al., "Rheocasting," *McGraw–Hill Yearbook of Science and Technology,* pp. 49–59, (1978).

V. Laxmanan et al., "Deformation of Semi–Solid Sn–15 Pct. Pb Alloy," *Metall. Trans. A.,* vol. 11A: 1927–1937, (1980).

T. Matsumiya et al., "Modeling of Continuous Strip Production by by Rheocasting," *Metall. Trans. B.,* vol. 12B: 17–31 (1981).

S.B. Brown et al., "Net Shape Forming via Semi–Solid Processing," *Advanced Materials & Processes,* vol. 143, No. 1: 36–40 (1993).

M.C. Flemings, "Behavior of Metal Alloys in the Semisolid State," *Metallurgical Transactions B,* vol. 22B, No. 3: 269–293 (1991).

Takao; "Pressure Measuring Device of Plasticizing Material in Injection Molding and Injection Molding Machine"; Patent Abstracts of Japan vol. 014, No. 495; Oct. 29, 1990;

Publication No. 02 202420; Publication Date: Aug. 10, 1990; Abstract.

Keizo; "Method and Apparatus for Continuously Forming Metallic Slurry for Continuous Casting"; Patent Abstracts of Japan; vol. 013, No. 484; Nov. 2, 1989; Publication No. 01 192447; Publication Date: Aug. 2, 1989. Abstract.

Kenjiro; "Method for Injection Molding Foamed and Molded Item"; Patent Abstract of Japan; vol. 008, No. 284; Dec. 26, 1984; Publication No. 59 152826; Publication Date: Aug. 31, 1984; Abstract.

* cited by examiner

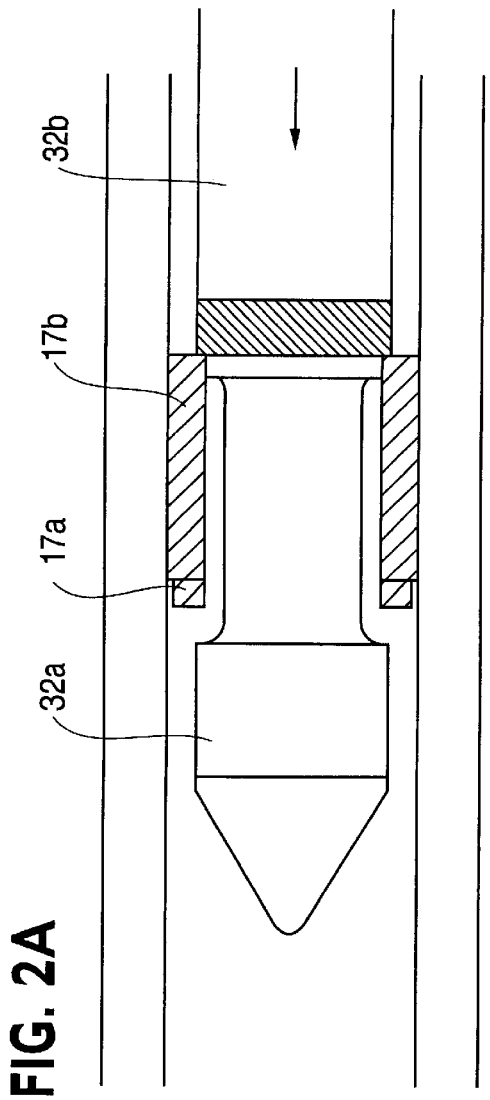
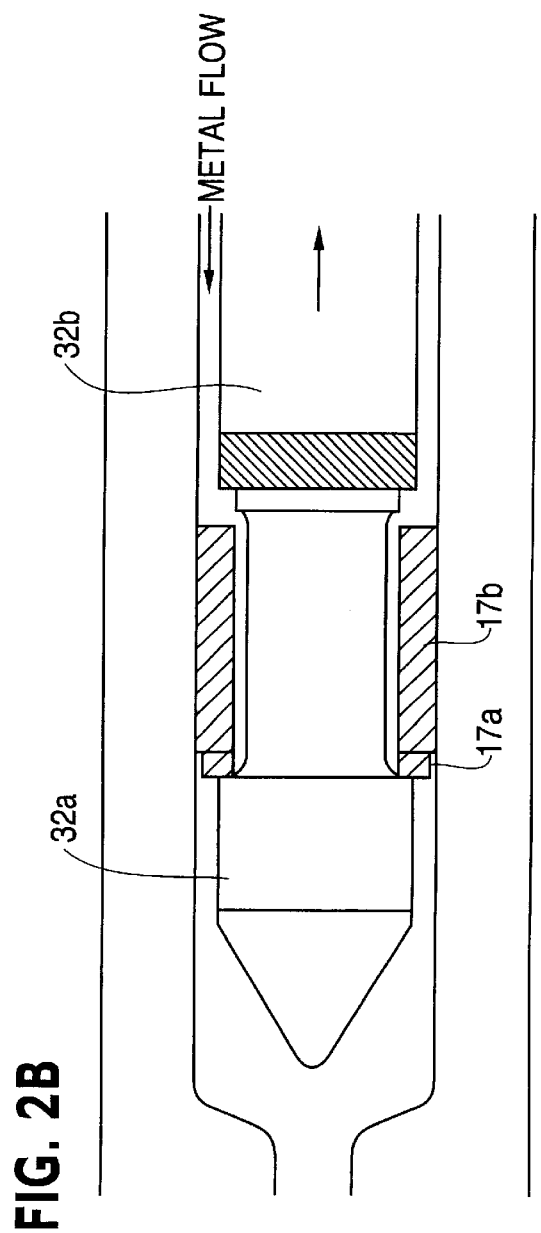
FIG. 2A
FIG. 2B

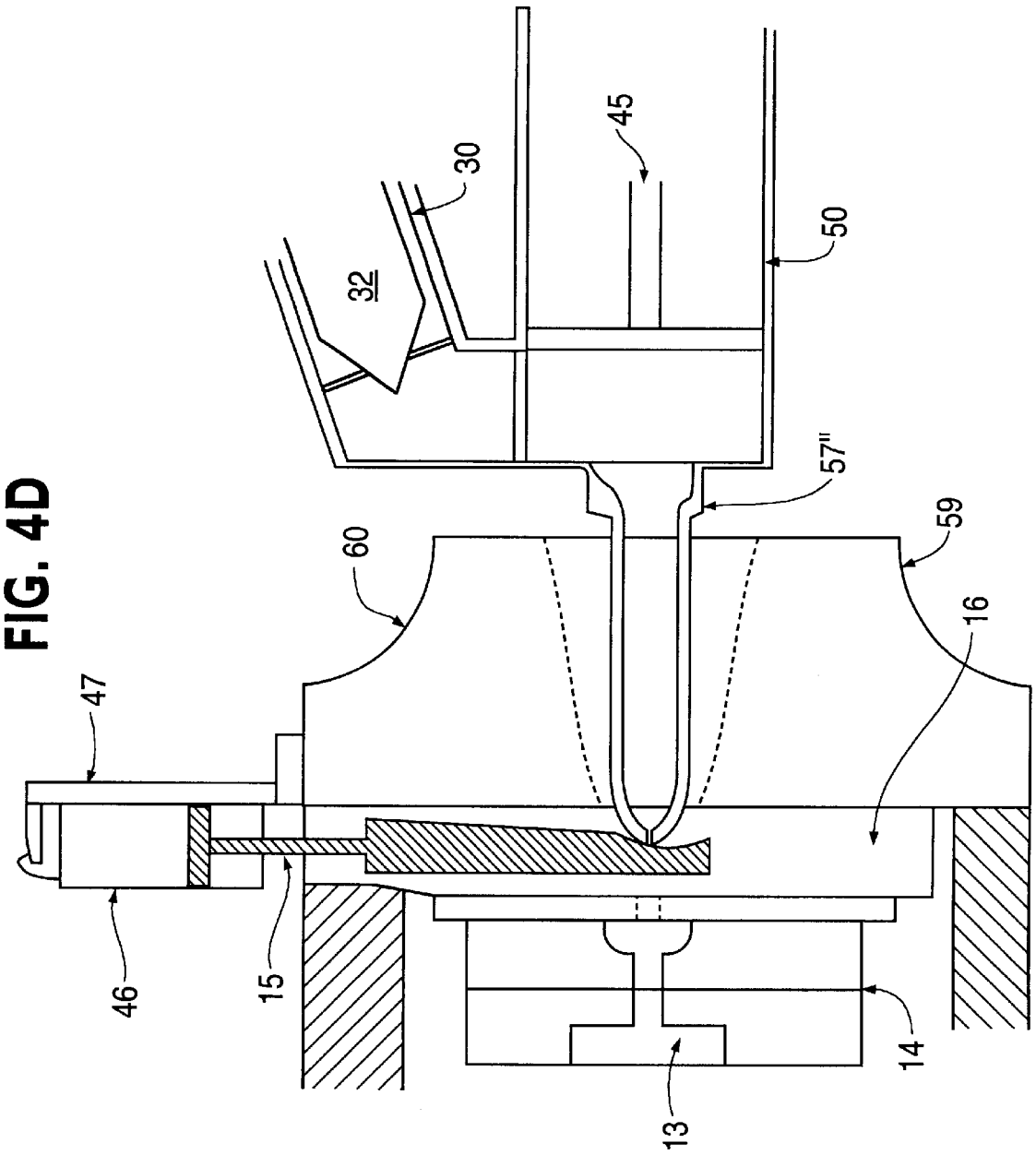

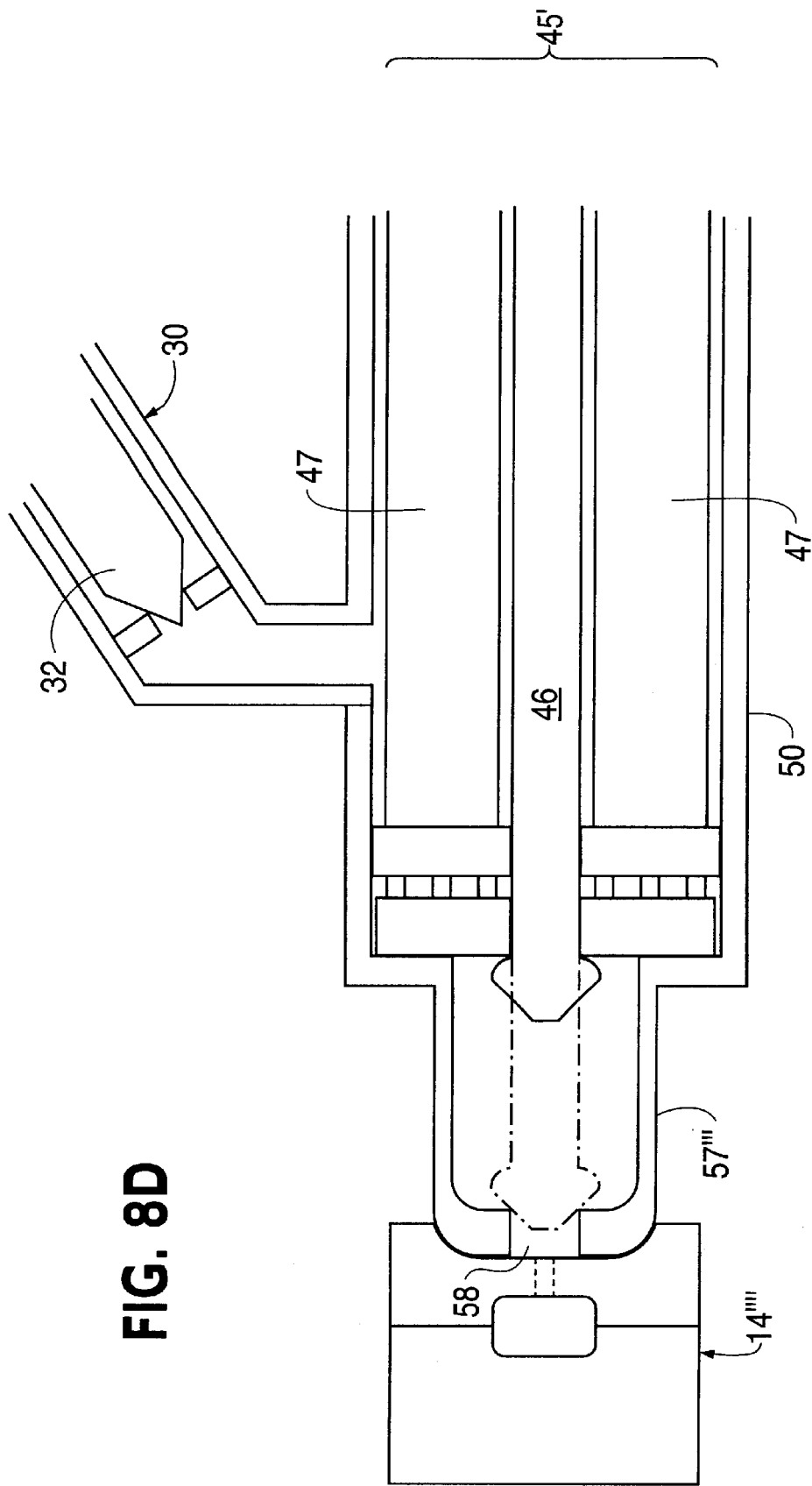

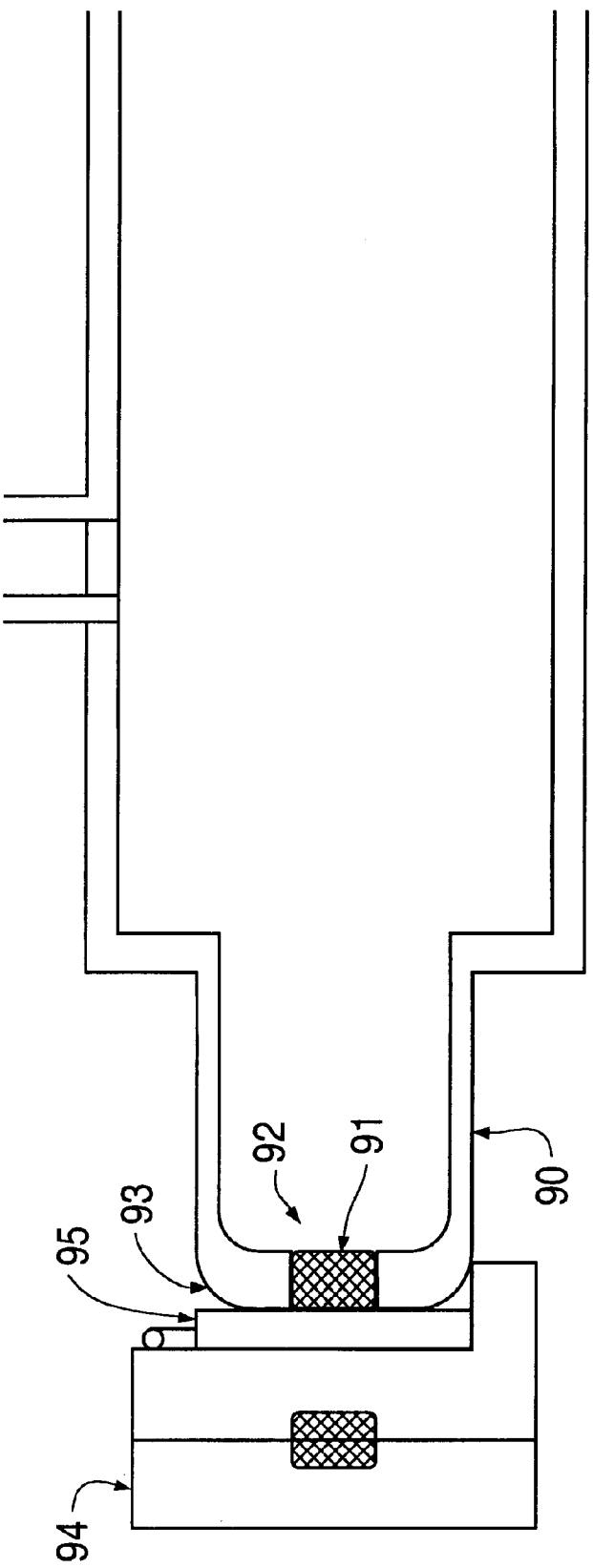

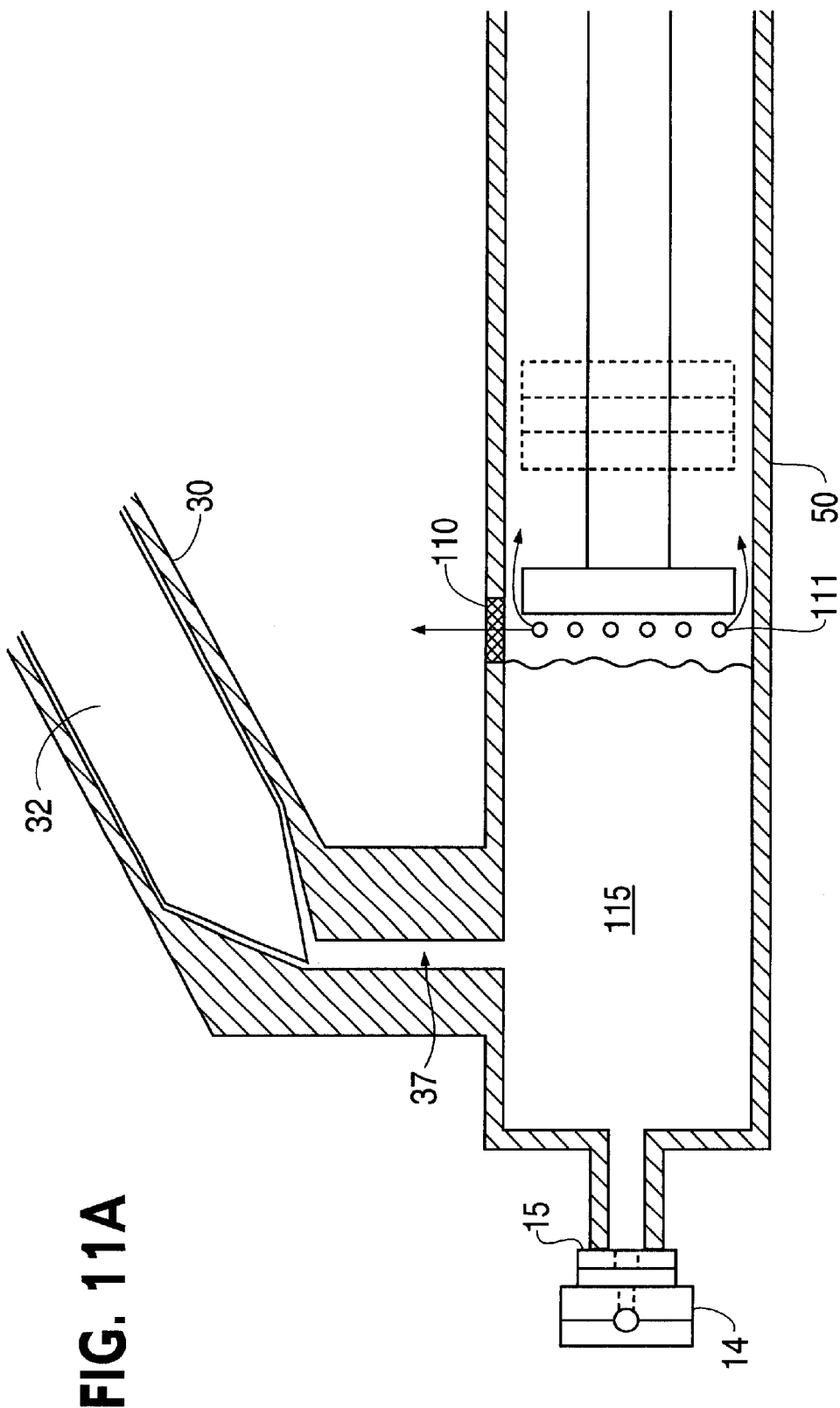

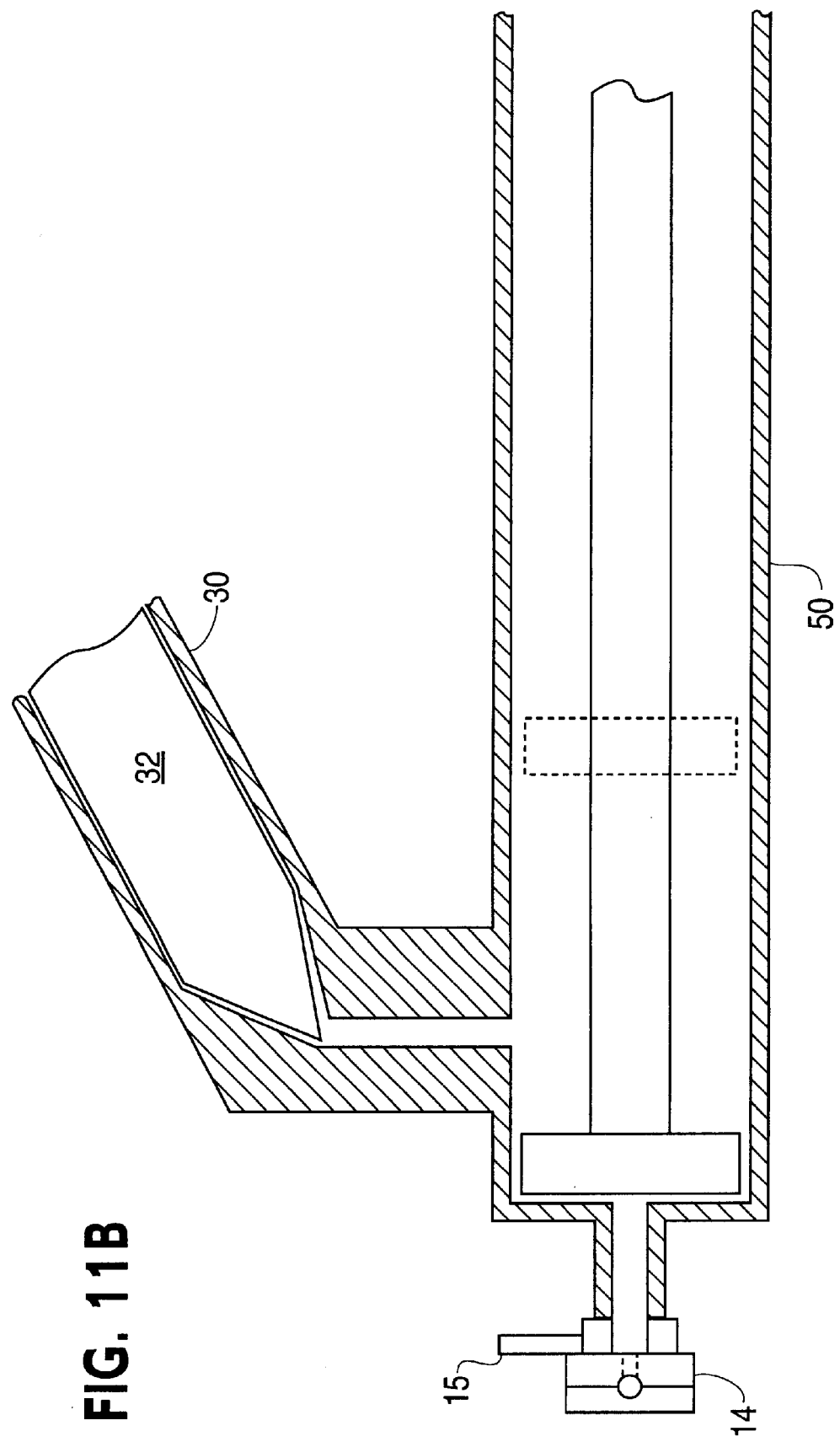

METHOD AND APPARATUS FOR MANUFACTURING METALLIC PARTS BY INK INJECTION MOLDING FROM THE SEMI-SOLID STATE

RELATED APPLICATION

This application is a continuation, of application Ser. No. 09/160,330, filed Sep. 25, 1998, which in turn claims benefit of priority from provisional application Ser. No. 60/080,078, filed Mar. 31, 1998.

This application is related to application Ser. No. 09/330,147 filed on the same day as the current application, titled "Method And Apparatus For Manufacturing Metallic Parts by Fine Die Casting."

BACKGROUND OF THE INVENTION

1. Field of the Invention

The invention relates to a method and apparatus for manufacturing metallic parts, more particularly to a method and apparatus for manufacturing metallic parts by a process involving injection of a melted metal into a mold in a thixotropic state.

2. Description of the Related Art

One conventional method used to produce molded metallic parts from melted metal is by die casting. Die casting methods use liquid metal during casting and, as a consequence, molded metallic parts produced from this method can have low densities. Molded metallic parts having low densities are not generally desirable because of their reduced mechanical strength, higher porosity, and larger micro shrinkage. It is thus difficult to accurately dimension conventional molded metallic parts and, once dimensioned, to maintain their shapes. Moreover, molded metallic parts produced from conventional die casting have difficulty in reducing the resilient stresses developed therein.

Thixotropic methods for producing molded metallic parts generally improve upon the die casting method by injection molding a metal from its thixotropic (semi-solid) state rather than from its liquid state. The result is a molded metallic part which has a higher density than one produced from the die casting method. Thixotropic methods are disclosed in U.S. Pat. Nos. 3,902,544 and 3,936,298, both of which are incorporated by reference herein.

Methods and apparatuses for manufacturing molded metallic parts from melted metal in its thixotropic state are also disclosed in U.S. Pat. No. 5,501,226 and Japanese patent publications 5-285626 and 5-285627, which are incorporated by reference herein. Methods of converting a metal into a thixotropic state by controlled heating and shearing in an extruder are disclosed in U.S. Pat. Nos. 5,501,226, 4,694,881 and 4,694,882. The systems disclosed in these patent documents are essentially in-line systems, in which the conversion of the metal alloy into a thixotropic state is assisted by an extruder and the pressurizing of the same for the purposes of injection molding; all these steps are carried out within a single cylindrical housing. It is difficult to accurately control all of the process parameters within a single cylindrical housing, especially temperature, shot volume, pressure, time, etc., and as a result, molded metallic parts of inconsistent characteristics are produced.

Moreover, some of these systems require that the metal supplied to the feeder be in pellet form. As a consequence, if a molded metallic part of undesired characteristics is produced by its system, recycling of the defective part is not possible unless the defective part is first recast in pellet form.

The present inventor's co-pending application, Ser. No. 08/873,922, filed on Jun. 12, 1997, which is incorporated by reference herein, describes a different and improved method for producing molded metallic parts from melted metal in a thixotropic state wherein the conversion of melted metal into the thixotropic state takes place in a physically separate location from the location where the metal is injected into the mold and under different conditions.

An improved system for manufacturing molded metallic parts, which is capable of accurately producing molded metallic parts of specified dimensions within a narrow density tolerance that operates with melted metal in a thixotropic state, is desired. Further, a production process for molded metallic parts that can consistently produce molded metallic parts of desired characteristics and that can easily accommodate recycling of defective parts is desired. Further, an improved production process for molded metallic parts made of lighter metals, like magnesium, is desired.

SUMMARY OF THE INVENTION

An object of the invention is to provide a method and apparatus for producing molded metallic parts through injection of melted metal into a mold.

Another object of the invention is to provide an improved injection molding system for producing molded metallic parts that is capable of producing molded metallic parts of accurate dimensions within a narrow density tolerance and operates using melted metal a thixotropic state.

Still another object of the invention is to provide an injection molding system for molded metallic parts that is capable of producing metallic parts of desired characteristics in a consistent manner.

Still another object of the invention is to provide an injection molding system that minimizes the amount of gas trapped in melted metal prior to its injection into the mold.

Still another object of the invention is to provide molded metallic parts having exceptionally smooth surfaces.

Still another object of the invention is to provide molded metallic parts having reduced porosity compared to parts produced by known die casting and thixotropic methods.

Still another object of the invention is to provide molded metallic parts that do not need to be further processed before they are painted.

Still another object of the invention is to provide an injection molding system for producing molded metallic parts that accommodates recycling of defective molded metallic parts easily.

These and other objects are accomplished by an improved injection molding method for producing molded metallic parts comprising the steps of introducing melted metal into a first chamber through a feeder port, allowing at least a portion of the melted metal to flow through said first chamber toward an outlet port, drawing into a second chamber at least a portion of the melted metal through the outlet port under a suction created in said second chamber, pushing at least a portion of the melted metal remaining in the first chamber into said second chamber, and injecting the melted metal from the second chamber into a mold.

The improved system comprises a feeder in which the metal is melted. Melted metal is allowed to flow from the feeder through a feeder port into a first chamber. At least a portion of the melted metal is drawn into a second chamber, assisted by suction through an outlet port leading from the first chamber into the second chamber. A ram in the first chamber pushes some of the remaining melted metal from the first chamber through the outlet port leading into the second chamber, thereby forcing out gas that has accumulated in the second chamber between the melted metal and a piston (commonly referred to as the "plunger") that is positioned inside the second chamber. The pressure from the melted metal being driven into the second chamber by the ram forces the gas between the melted metal and the piston to flow past the piston through the small space between the piston and the wall of the second chamber. The piston in the second chamber then injects the melted metal, which is substantially gas-free, into a mold. Before the injection, the piston in the second chamber is retracted to draw in the melted metal from the first chamber by creating suction and also to regulate the volume of melted metal that is held in the second chamber prior to injection so that it precisely corresponds to the size of the molded part.

The above-described process and system provide a very precise control of the injection volume, to within ±0.5% by weight or less, because the injection volume is determined in accordance with the position of the piston and any gas that is present in the melted metal, which can be about 20% by volume, is forced out by operation the ram advancing, before the melted metal is injected.

Also, the method of the present invention can be used to mold parts of a thixotropic material that are more preferred than parts molded from current thixotropic processes. They generally require less post-molding processing, given their more accurate molding volume and smooth surfaces. This permits a production process that is stable over many runs.

In addition, the method of the present invention can provide molded parts of extremely fine dimensions, having thicknesses less than 1 mm for a rectangular-shaped part measuring about 21.0 cm by 29.7 cm (which is roughly the size of a DIN size A4 sheet of paper) and also having more complex structures.

Additional objects and advantages of the invention will be set forth in the description which follows. The objects and advantages of the invention may be realized and obtained by means of instrumentalities and combinations particularly pointed out in the appended claims.

BRIEF DESCRIPTION OF THE DRAWINGS

The invention is described in detail herein with reference to the drawings in which:

FIG. 2A is a side view showing one embodiment of a valve on the ram when it is in the position that prevents melted metal from flowing to positions to the right of the valve;

FIG. 2B is a side view showing one embodiment of a valve on the ram when it is in the position that permits melted metal to flow from the right of the valve to positions to the left of the valve;

FIG. 4D is a side view of the shut-off plate guide and the drive assembly for the nozzle shut-off plate.

FIGS. 8A–D are side views of an embodiment of an injection chamber which includes a two part piston.

FIG. 9 shows the side view of plug formation in prior art injection nozzles.

FIGS. 11A–B are side views of an alternative method of operating the piston.

DETAILED DESCRIPTION OF THE PREFERRED EMBODIMENTS

In the discussion of the preferred embodiment which follows, a metal alloy is produced by injection molding from a magnesium (Mg) alloy ingot or pellets which are melted and processed in a thixotropic state. The invention is not limited to processing of a Mg alloy and is equally applicable to other types of metals, metal alloys and materials.

The terms "melted metal" and "melted material" as used herein encompasses metals, metal alloys and other suitable materials which can be converted to a thixotropic state and processed in an injection molding system. A wide range of such metals is potentially useful in this invention, including aluminum (Al), Al alloys, zinc (Zn), Zn alloys, and the like.

Unless otherwise indicated, the terms "a" or "an" refer to one or more.

Unless otherwise indicated, the term "gas" refers to any gas (including air) that can be present in the injection chamber at start-up or that is trapped in the injection chamber and forced out during operation of the invention's system.

Specific temperature and temperature ranges cited in the following description of the preferred embodiment are applicable to the preferred embodiment for processing Mg alloy in a thixotropic state, but could readily be modified in accordance with the principles of the invention by those skilled in the art in order to accommodate other metals and metal alloys in a thixotropic state. For example, some Zn alloys become liquid at temperatures above 450° C. and thixotropic at about 380° C.–420° C., and the temperatures in the injection molding system of the present invention can be adjusted for processing of Zn alloys in a thixotropic state.

Figure 1:
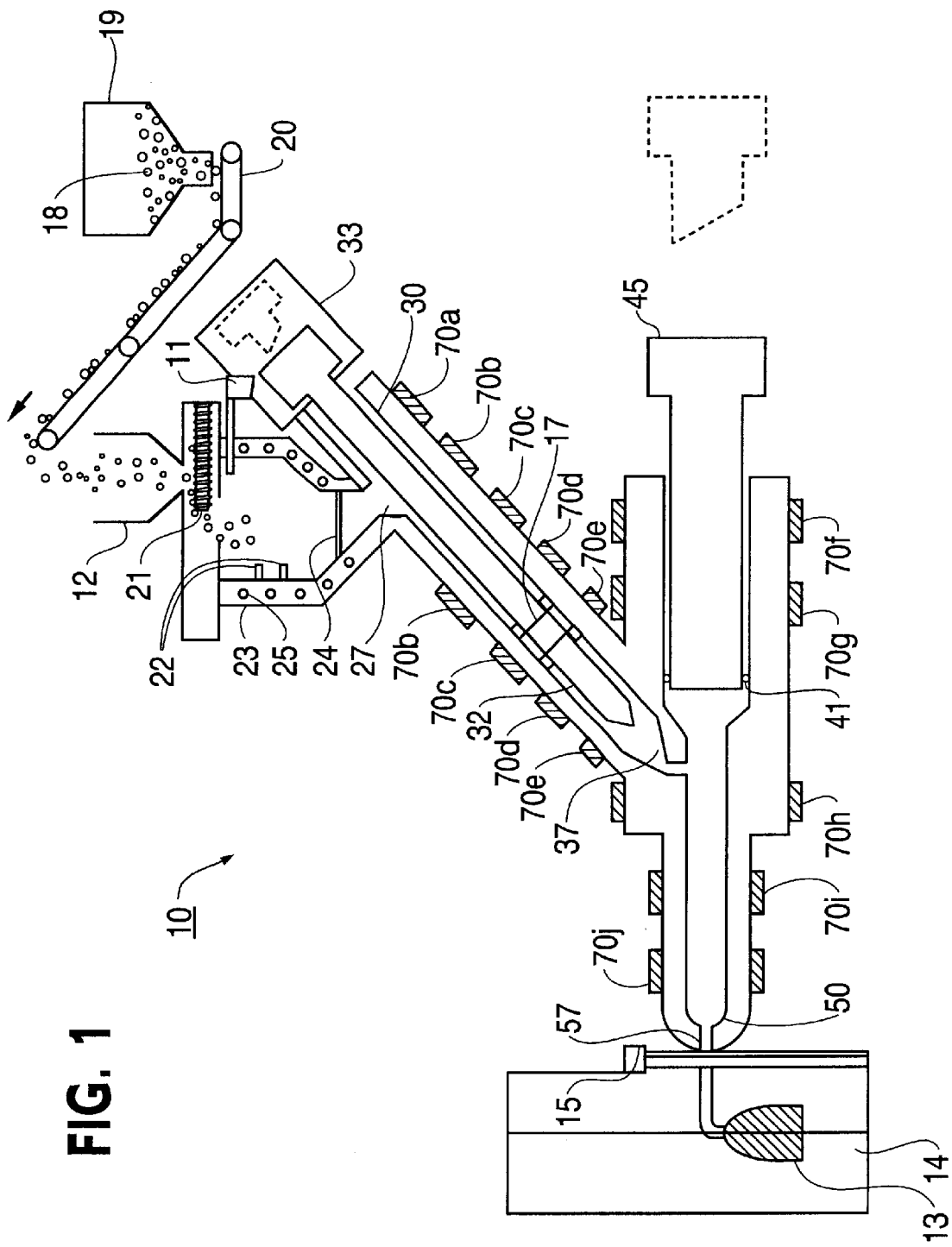
FIG. 1 is a schematic illustration of a side view of the injection molding system according to one embodiment of the invention.

FIG. 1 illustrates an injection molding system 10 according to a first embodiment of the invention. The system 10 includes pre-heat tank 19 where Mg alloy pieces or ingots 18 are pre-heated to approximately 250° C. A conveyor belt 20 transfers the pre-heated Mg alloy pieces or ingots 18 into a holding tank 12. Other transporting means can be used. A metering device shown as a threaded screw 21 feeds the Mg alloy pieces or ingots 18 into a feeder 23. The feeder 23 is provided with at least one heating element 25 disposed around its outer periphery. The heating element 25 may be of any conventional type and operates to maintain the feeder 23 at a temperature high enough to keep the metal alloy supplied through the feeder 23 in a liquid state. For a Mg alloy ingot, this temperature would be about 600° C. or greater. Two level detectors 22 detect minimum and maximum levels of melted metal in the feeder 23. When the upper level detector 22 detects that the level of melted metal has risen to a maximum point, it relays a signal to a microprocessor control unit (not shown) which instructs the screw 21 to stop dispensing. When the lower level detector 22 detects that the level of melted metal has been depleted to a minimum point, it relays a signal to the control unit which activates the screw 21 so that more Mg alloy is dispensed into the feeder 23.

Preferably, sufficient metal should be kept in the feeder 23 to supply about 20 times the volume needed for one injection cycle (or shot). This is because the amount of time required to melt the metal necessary for one injection cycle is longer than the injection cycle time, which in the preferred embodiment is about 30 seconds. The feeder 23 further includes a filter 24, which may be in the form of a grate whose openings are small enough to prevent Mg alloy pieces 18 from falling through while they are being melted. This is primarily a concern when the feeder 23 is initially started. After that, alloy pieces will fall into the molten bath and be melted, although larger pieces could also be introduced later on without concern. A mixer (not shown) in feeder 23 may be included for the purposes of evenly distributing the heat from the heating element 25 to the metal supplied to the feeder 23.

The feeder 23, pre-heat tank 19, and all elements therebetween contain an atmosphere of an inert gas to minimize oxidizing of the pre-heated and melted metal. A mixture of carbon dioxide ($CO_2$) and sulfur fluoride ($SF_6$) gas is preferred. However, other gasses, such as $CO_2$, $SF_6$, nitrogen or argon may be used alone or in any combination with each other. The inert gas may be introduced (e.g. from a pressurized tank) into the feeder 23 through port 11 to create an inert gas atmosphere above the bath. The inert gas also travels around the screw and into the pre-heat tank 19 to also minimize oxidizing there, as well. It is therefore preferred for the entire feeding system as described to be maintained under an inert gas environment.

The melted metal is subsequently supplied into a temperature-controlled barrel 30 by way of gravity through a feeder port 27 which may optionally be supplied with a valve serving as a stopper (not shown). Preferably, no valve is present. A ram 32 is arranged coaxially with the barrel 30 and extends along the center axis of the barrel 30. The outer diameter of the ram 32 is smaller than the inner diameter of the barrel 30 such that melted metal flows in the space between the ram 32 and the barrel 30. The ram 32 is also controlled by motor 33 for axial movement in both retracting and advancing directions along the barrel 30 and for rotation around its own axis if stirring of the melted metal is desired inside barrel 30.

A valve 17 is mounted around the outer circumference of the ram 32 to separate the barrel 30 into upper and lower chambers. The valve 17 opens and closes to selectively permit and block the flow of metal between the upper and lower chambers of the barrel 30. Suitable valves having such a function are known per se to those skilled in the art, and any of them may be used for purposes of the present invention. Preferably, the valve 17 is frictionally mounted on an inner circumference of the barrel 30 and slidably mounted on the outer circumference of the ram 32 such that, when, for example, the ram 32 retracts upwardly in the barrel 30, the valve 17 moves relative to the ram 32 to permit flow of melted metal therethrough, and when, for example, the ram 32 advances downwardly in the barrel 30, the valve 17 moves relative to the ram 32 to block flow therethrough.

Figure 2C:
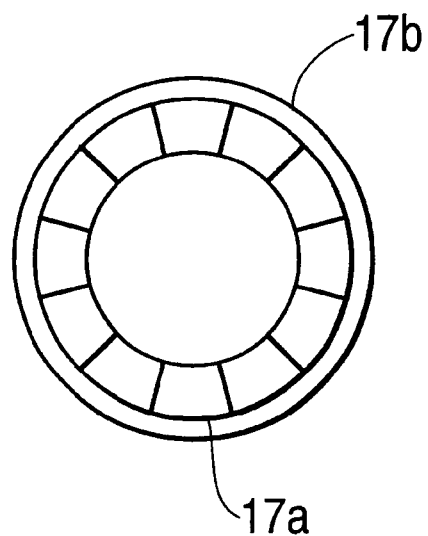
FIG. 2C is a front view showing one embodiment of a valve when it is not fitted onto the ram.
Figure 2D:
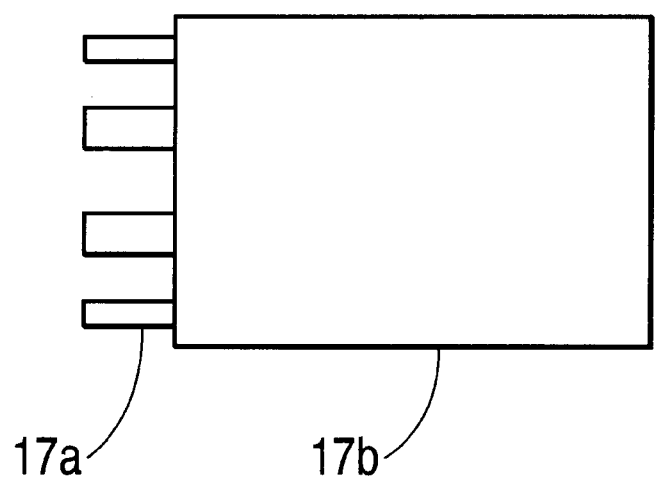
FIG. 2D is a side view showing one embodiment of a valve when it is not fitted onto the ram.

FIG. 2A is a side view showing one embodiment of a valve on the ram when it is in the position that prevents melted metal from flowing to positions upstream of (to the right of) the valve. FIG. 2B is a side view showing one embodiment of a valve on the ram when it is in the position that permits melted metal to flow downstream of the valve (to the left of the valve). FIG. 2C is a front view showing one embodiment of a valve when it is not fitted onto the ram. FIG. 2D is a side view showing one embodiment of a valve when it is not fitted onto the ram.

In the closed position of FIG. 2A, the rear section 17b of the valve 17 abuts the body 32b of the ram 32. The blockage of the flow in this position permits the ram 32 to push the metal in the lower chamber into an injection chamber 50 through an outlet port 37 (see FIG. 1) without the metal flowing back (as shown in FIG. 2A) into the upper chamber. In the open position of FIG. 2B, the front section 17a of the valve 17 abuts the head 32a of the ram 32. The metal is permitted to flow through the valve in this position because the front section 17a of the valve 17 has gaps formed between toothed portions and the flow through the valve 17 takes place through these gaps. As a result, when the valve 17 is in the open position, the metal in the upper chamber flows into and collects in the lower chamber.

The ram 32 as shown in the Figures has a pointed tip, but any shape may be used, including a blunt end or a rounded end. Preferably, the end of ram 32 has a shape capable of blocking outlet port 37 to prevent the flow of melted metal between barrel 30 and injection chamber 50 if ram 32 is fully advanced inside barrel 30. While injection takes place, ram 32 is preferably fully advanced inside barrel 30 so that outlet port 37 is closed. However, the ram 32 need not be fully advanced since valve 17 and the melted metal that occupies the lower chamber of barrel 30 would also prevent melted metal from leaving the second chamber during injection. After injection, the ram 32 is retracted (but may continue rotating if rotation is being used to stir the melted metal inside barrel 30), and a piston 45 which is housed in the injection chamber 50 begins retracting (moved to the right as shown in FIG. 1) to expand the volume of the injection chamber 50 to a desired volume according to the dimensions of the molded part being produced. The piston 45 is stopped when the volume of the injection chamber 50 becomes equal to the desired injection volume. The piston 45 may be retracted at the same time that ram 32 is being retracted or after ram 32 has been retracted to a desired position.

After piston 45 is stopped, the ram 32 is advanced downward, and, as a result, a portion of the metal collected in the lower chamber of barrel 30 is pushed into the injection chamber 50 through the outlet port 37. The pressure of the metal entering into injection chamber 50 assists in driving out gas present in the injection chamber 50 that accumulates between the melted metal and piston 45. The ram 32 preferably advances through barrel 30 until its end closes off outlet port 37, and the ram 32 preferably remains in this position to keep outlet port 37 sealed off until injection is complete and the next shot is started.

During each shot, a certain amount of gas accumulates between the melted metal and the piston 45 as the melted metal enters injection chamber 50. The volume of this gas can make up as much as 20% of the volume of the injection chamber 50. Injecting such a melted metal/gas mix into a mold can result in molded parts that have uneven surfaces, porosity (caused by gas bubbles trapped in the metal's surface), or other imperfections including those that result from an inconsistent volume of melted metal being injected. Removing as much gas as possible before injection is desired. In the method of the present invention, that gas evacuation is primarily accomplished in two ways. First, the piston 45 and injection chamber 50 can evacuate gas like a pharmaceutical syringe that draws in liquid from a container of liquid. Specifically, as piston 45 retracts, it creates a suction to draw in melted metal from the barrel 30 into the injection chamber 50 and it pushes gas out behind it. Secondly, the additional portion of melted metal driven into the second chamber by ram 32 forces the gas that accumulates between the melted metal and the piston 45 to escape around the small space between the piston 45 and the wall of the second chamber (i.e., the gas is forced out to the right of piston 45 due to the pressure of the melted metal). Optionally, an O-ring seal or other implement may be fitted around at least a portion of piston 45 that allows the gas to pass behind piston 45 and out of the system but not back in. An injection nozzle 57 is provided with a nozzle shut-off plate 15 which is lowered to prevent the melted metal from escaping out of the injection chamber 50 when the ram 32 pushes the metal into the injection chamber 50. When the injection chamber 50 has been filled with the metal and substantially all gas has been forced out, the nozzle shut-off plate 15 is pulled up and the nozzle 57 is moved forward (to the left in FIG. 1) to contact the opening in a die 14. In the preferred embodiment, the movement of the nozzle 57 is achieved by mounting the entire apparatus on a slide and moving the entire apparatus towards the die 14 (to the left in FIG. 1).

Simultaneously, the piston 45 is pushed to the left, relative to the injection chamber 50, to force the melted metal in the injection chamber 50 through the die 14 into a mold 13. After a pre-set dwell time, the two halves of the die are opened and the molded metallic part is removed, so that a new cycle can begin.

The melted metal, while housed in injection chamber 50, is substantially sealed off from gas that would otherwise enter injection chamber 50 from outside the machine by virtue of nozzle shut-off plate 15, seal 41 on piston 45, and the melted metal which continuously occupies barrel 30 during operation. Although gas is present in injection chamber 50 prior to start-up, the first run of shots drives out substantially all gas in injection chamber 50. Thus, the melted metal that is injected from injection chamber 50 into mold 13 is substantially free of gas. Preferably, the amount of gas present in injection chamber 50 during injection is less than 20%, more preferably less than or equal to 1% by volume of the second chamber. As shown in FIG. 1, heating elements 70f–70j are also provided along the lengths of the injection chamber 50.

Thixotropic metals are those that can be made into a semi-solid slurry before injection. Thixotropic metals contain solid metal particles or regions suspended in the surrounding liquid phase. The resulting molded metallic parts contain regions of primary and secondary solids. Specifically, the metal to be made into the thixotropic (e.g. semi-solid) state can be fed into the barrel 30 as a melted metal, as discussed below, or after-heated to a temperature between that metal's solidus and liquidus temperatures (i.e., in the semi-solid state). If the metal begins traveling down the length of the barrel 30 in a liquid phase, then the temperature profile in the barrel 30 is selected so that a thixotropic slurry is eventually formed in the injection chamber 50. As the liquid metal travels down the length of the barrel 30, it is gradually cooled to create the slurry. Such an arrangement is explained in detail in applicant's co-pending application, Ser. No. 08/873,922, incorporated herein by reference in its entirety. If the metal is fed into the barrel 30 already as a semisolid slurry, then the temperature profile in the barrel 30 is selected so that the slurry is maintained. For example, the temperature in the barrel 30 can be maintained throughout at a temperature between the alloy's solidus and liquidus temperatures. Regardless of the method by which the thixotropic slurry is made, the slurry is ultimately loaded into injection chamber 50 and then injected into a mold.

The temperature in the feeder differs depending on the material present in the feeder. The temperature inside the feeder 23 is preferably high enough to maintain the metal in the liquid state. For the AZ91 Mg alloy, heating elements 25 are preferably controlled so that the temperature in the feeder 23 is above 600° C., preferably about 640° C. near the upper surface of the melted Mg alloy and about 660° C. near the lower region of feeder 23. Heating elements referenced and prefixed by the numeral 70 are preferably resistance heating elements.

In the barrel 30, the temperature should be maintained at or below the metal's liquidus temperature but above the metal's solidus temperature. The temperature near heating elements 70a and 70b is preferably maintained at around 600° C. for the AZ91 Mg alloy. The temperature near heating elements 70c is maintained at around 580° C. The temperature near heating elements 70d and 70e is maintained at around 550° C. for the AZ91 Mg alloy. These temperatures facilitate the downward flow of metal toward outlet port 37 and inhibit flow in the opposite direction.

In the injection chamber 50, the temperature near heating elements 70f, 70g, 70h, and 70i, is preferably maintained at around 550–570° C. for the AZ91 Mg alloy to maintain it in a semi-solid state. This lower temperature also helps prevent the metal from flowing past the seal 41. The temperature near heating elements 70j is preferably maintained at around 570–580° C. for the AZ91 Mg alloy.

Using the preceding temperatures at these locations permits molding of the AZ91 Mg alloy in the thixotropic state. Under these conditions, one cycle lasts approximately 30 or more seconds. Molded metallic parts having extremely smooth surfaces and minimal porosity can be produced, which allows them to be painted directly without any further processing. The castings also have extremely accurate dimensions and consistency, and can be produced with thicknesses of less than 1 mm when the part roughly has the dimensions of a DIN size A4 sheet of paper (21.0 cm by 29.7 cm). Preferably, the range of thickness of molded parts produced according to the invention is between 0.5 and 1 mm for parts that have roughly the dimensions of a DIN size A4 sheet of paper. With known die casting and thixotropic methods, thicknesses no less than about 1.3 mm can be obtained for parts that have roughly the dimensions of a DIN size A4 sheet of paper.

Figure 3:
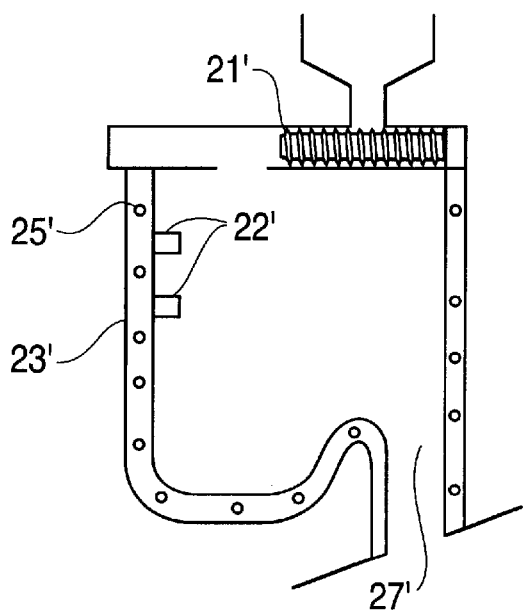
FIG. 3 is a side view of an alternative embodiment of the feeder tank.

FIG. 3 shows an alternative embodiment of the invention having a feeder 23'. Like the feeder 23 of FIG. 1, the feeder 23' of FIG. 3 includes metering screw 21', level indicators 22', and heating elements 25'. However, the feeder 23' of FIG. 3 has a lower region with a bottom surf ace that is at a lower position than feeder port 27'. This lower region catches sludge and other material that is heavier than the melted metal and prevents them from passing through the feeder port 27', ensuring that pure melted metal enters barrel 30. Another opening (not shown) may be provided from this lower region for periodically extracting the heavier material.

Figure 4A:
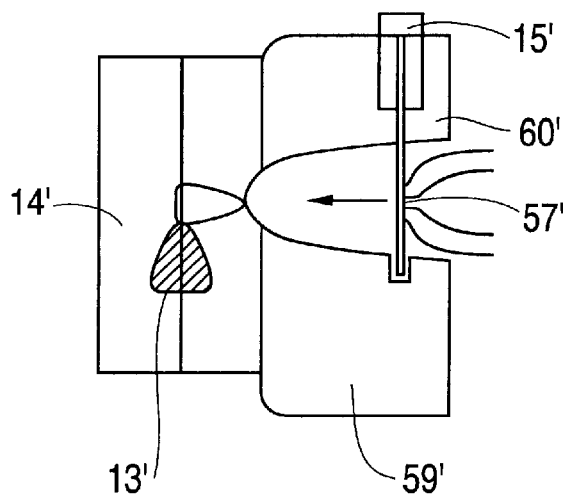
FIG. 4A is a side view of an embodiment of the nozzle shut-off plate which includes a die plate that rests flush against the nozzle.

FIG. 4A shows an alternative embodiment of the invention having a nozzle shut-off plate 15' that is positioned a predetermined distance away from a die 14'. In this alternative embodiment, when the nozzle shut-off plate 15' is pulled up, the nozzle 57 is pushed to the left to enter a relatively deep recess that extends partially into support walls 59 and 60. Die 14' is then positioned to abut support walls 59 and 60. The recess ensures proper alignment of the nozzle 57' with the opening that leads into mold 13'. The nozzle shut-off plate may be maintained at a temperature that minimizes solidification of the melted metal in the nozzle. This may be achieved by providing a heating element on or inside the shut-off plate. However, the plate may also be left unheated.

Figure 4B:
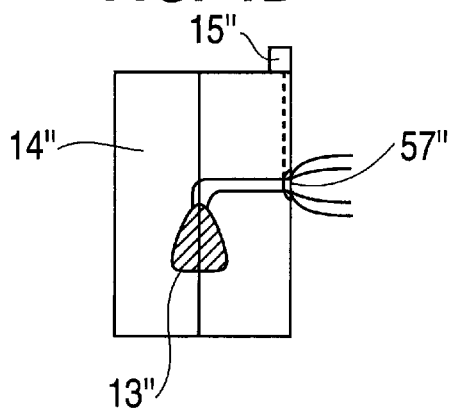
FIG. 4B is a side view of an alternative embodiment of the nozzle shut-off plate which includes a recess in the die assembly to receive the nozzle.

FIG. 4B shows a side view of an alternative embodiment of the invention having a nozzle shut-off plate 15" that retracts and advances through a slot just inside the right edge of die 14". In this alternative embodiment, when the nozzle shut-off plate 15" is pulled up, the nozzle 57" is pushed to the left to enter a relatively shallow recess that extends partially into the die 14". The shallow recess ensures proper alignment of the nozzle 57" with the opening that leads into mold 13". Support walls 59' and 60' assist in aligning the nozzle.

Figure 4C:
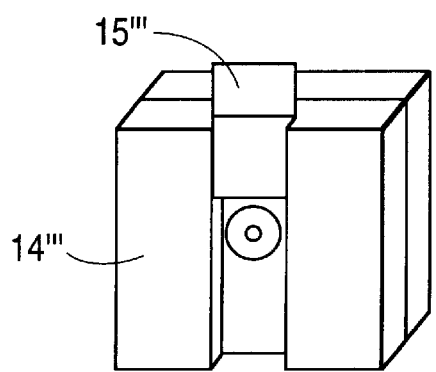
FIG. 4C is a front view of an alternative embodiment of a die assembly which has a receiving slot to guide the nozzle shut-off plate.

FIG. 4C shows a front view of an alternative embodiment of the invention having a nozzle shut-off plate 15"' that retracts and advances through a slot in the face of die 14"'. In this alternative embodiment, when the nozzle shut-off plate 15"' is pulled up, a shallow recess, shown as the larger circle around the smaller circle that is the opening into the die 14"', is exposed. The shallow recess ensures proper alignment of the nozzle (not shown) with the opening into die 14"'. In an alternative embodiment (not shown), the shallow recess may be placed on support walls 59' and 60' enclosing the nozzle 57', with the shut-off plate moving within that recess.

A further embodiment of the present invention shown in FIG. 4D is directed to operation of nozzle shut-off plates 15, 15', 15" and 15"' shown in FIGS. 1 and 4A–C. In this embodiment, the shut-off plate 15 moves up and down between the face of the die 14 and support walls 59 and 60 inside the shut-off plate guide 16. Shut-off plate guide 16 could be a vertical void, which can be formed between the die face and the support walls as shown in FIG. 1 or inside the die as shown in FIGS. 4A–C. The guide 16 can also comprise a void in another direction, such as horizontal. The shut-off plate 15 is moved through the guide 16 by a cylindrical motor, an oil cylinder and/or an air cylinder 46. The cylindrical motor 46 is held upright by a cylinder guide 47.

In an alternative embodiment, the process disclosed can be used to create and mold thixotropic metals. With minor modifications to process parameters, essentially the same process can be used.

In one embodiment, metal ingots can be loaded into the apparatus of the present invention instead of metal pellets or chips. There are several advantages of using ingots instead of metal pellets and chips. First, the ingots are cheaper than pellets or chips. Second, the pellets tend to agglomerate into clusters on the surface of the liquid metal in the feeder. This increases the time it takes to melt the pellets, because only the pellets on the bottom of the cluster are in contact with the liquid metal. The pellets on top of the cluster are only in contact with the solid pellets below them. On the other hand, the heavier ingots sink to the bottom of the feeder. Therefore, since the entire ingot is surrounded by the liquid metal, it melts faster than the pellets. A loading system configured for loading ingots may also be used to load recycled molded metallic parts of undesired characteristics into the feeder without recasting the defective part in pellet form. Thus, recycled parts may be used instead of ingots according to another aspect of this embodiment.

Figure 5A:
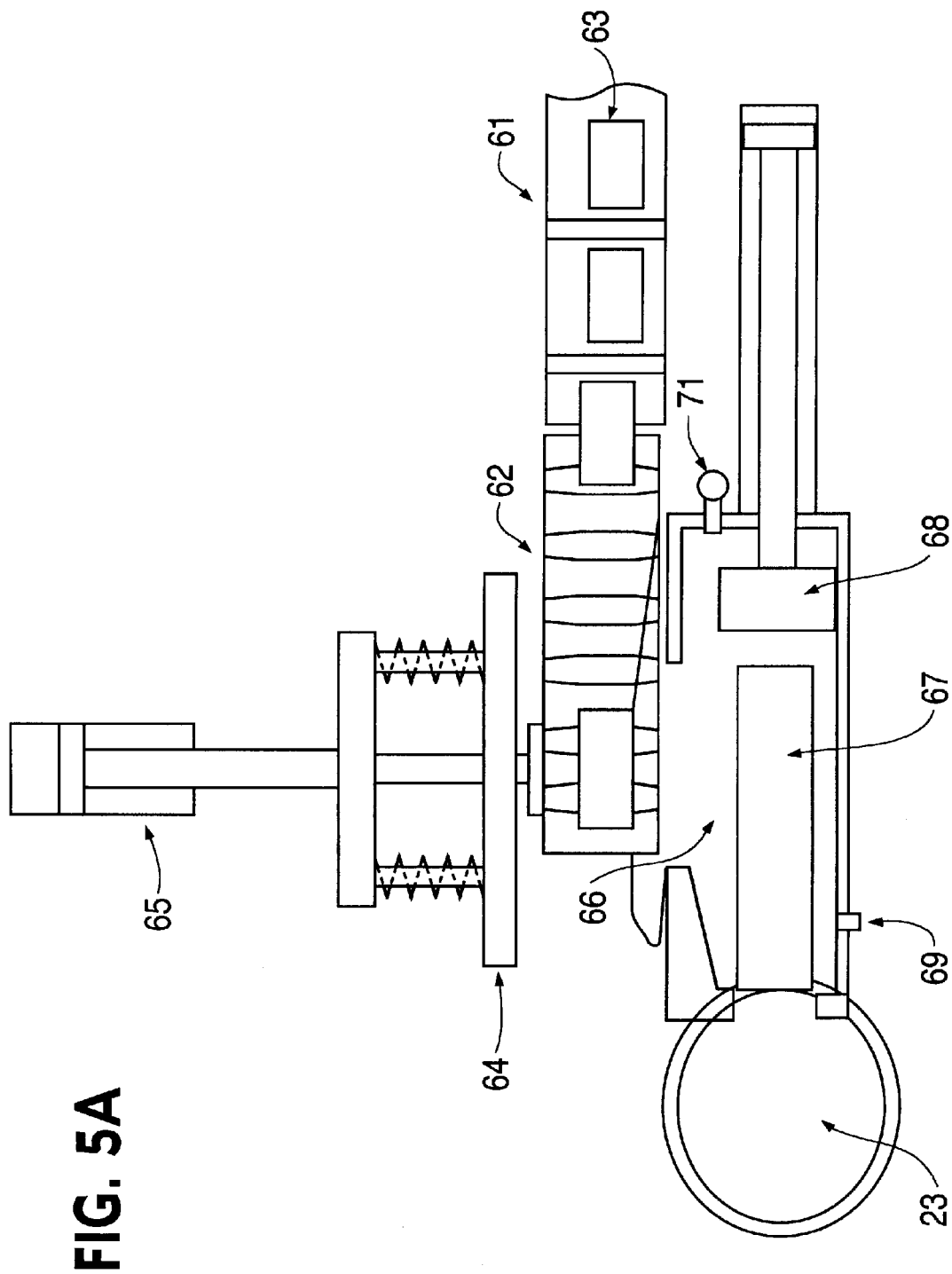
FIG. 5A is a top view of an embodiment of a loading system used to load metal ingots into the apparatus of the present invention.

FIG. 5A shows a top view of an alternative loading system to that shown in FIG. 1 for loading metal ingots 63 into the feeder 23. Ingots may comprise Mg, Zn, Al or alloys thereof or other metals and alloys. The ingots 63 are transported from a first conveyor belt 61 onto a second conveyor belt 62. A push arm 64 controlled by a conventional motor 65 pushes the ingots 63 into the holding chamber 66. The push arm has a size sufficient to completely cover the opening to the holding chamber. The push arm can form an air tight seal with the opening into the holding chamber, if desired. The ingots 63 inside the holding chamber 66 end up on a downward sloping part 67, where a motor controlled piston 68 pushes the ingots 63 into the feeder 23. The holding chamber is preferably maintained under an inert gas ambient, supplied from a gas port. The gas may be argon, nitrogen or a sulfur hexafluoride and carbon dioxide mix. The gas pressure in the holding chamber 66 should preferably be maintained at a pressure above one atmosphere to prevent outside air, which contains oxygen, from reaching the feeder 23. The gas pressure and/or the position of the ingots may be monitored by one or more sensors. The controlled atmosphere in the holding chamber 66 allows a decreased amount of air in the feeder and thus decreases a chance of explosion.

Figure 5B:
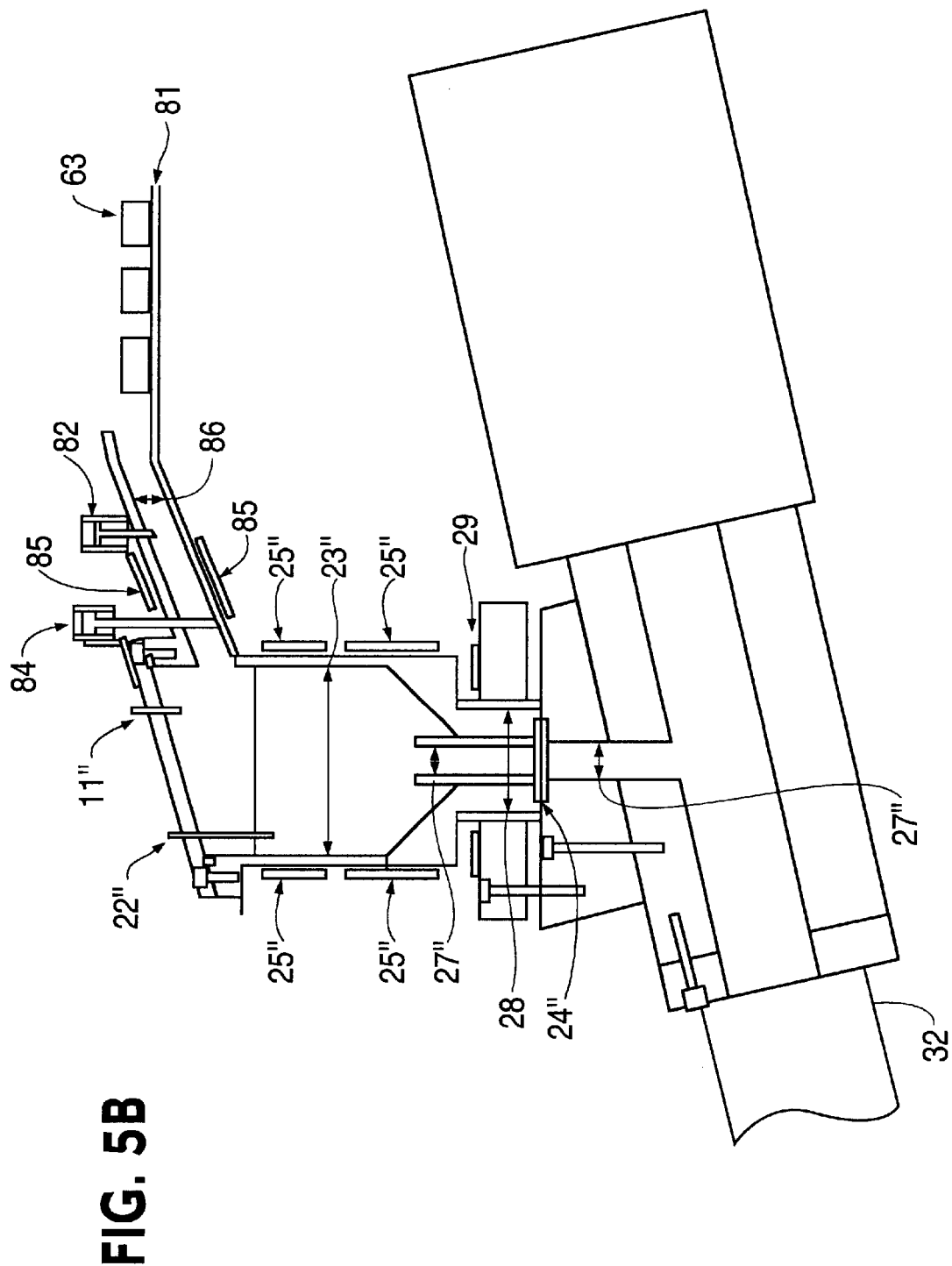
FIG. 5B is a side view of another embodiment of a loading system which includes sealing doors.

FIG. 5B shows a side view of another alternative loading system to that shown in FIGS. 1 and 5A for loading metal ingots 63 into the feeder 23. The ingots 63 are transported on a conveyor 81 to a downward sloped holding chamber 86. Access to the holding chamber is controlled by a first door 82. Egress from the holding chamber is controlled by a second door 84. The chamber may be heated by heaters 85 to 100–200° C. to evaporate moisture on the surface of the ingots. The holding chamber 86 operates as follows. First, door 82 is opened as ingot 63 approaches it. Door 82 can preferably be opened by moving up, down or sideways through the walls of chamber 86. The ingot 63 enters the chamber 86 and the first door 82 is closed. After the first door 82 is closed, the second door 84 is opened and the ingot 63 moves out of chamber 86. The conveyor 81 can move continuously through chamber 86 with doors 82 and 84 opened and closed while the conveyor is moving.

Alternatively, the conveyor 81 moves intermittently. It stops when an ingot approaches door 82 and when the ingot is inside the chamber 86. This allows doors to be sealed hermetically. The conveyor 81 may also end at the sloping part of chamber 86, such that the ingots slide down under the force of gravity.

In another alternative embodiment (not shown), the loading system shown in FIG. 5A can be used with door 82 of FIG. 5B positioned between conveyor 62 and chamber 66 and with door 84 of FIG. 5B positioned between chamber area 67 and the melt tank (e.g. melt feeder) 23. Door 82 opens synchronously with the movement of the push arm 64, while door 84 opens synchronously with the movement of piston 68.

The holding chamber 86 in FIG. 5B is connected to the melt tank 23". Melt tank 23" contains a single metal level detector 22". Alternatively, two level detectors 22, shown in FIG. 1 can be used. Tank 23" also contains gas port 11". An inert gas, such as at least one gas selected from a group comprising nitrogen, argon, $SF_6$ and $CO_2$, is introduced (e.g. under pressure from a pressurized tank) into melt chamber 23". The gas pressure of the pumped gas is preferably above one atmosphere to keep air from entering the melt tank 23" through holding chamber 86 (the pumped gas flows out through chamber 86, thus preventing air from flowing into chamber 86).

The melt chamber shown in FIG. 5B also contains heaters 25", a screen 24" and a feeder port 27" located above the bottom of the tank, similar to feeder tank 23' shown in FIG. 3. The screen may be formed inside port 27" or above port 27", as shown in FIG. 1.

Figure 5C:
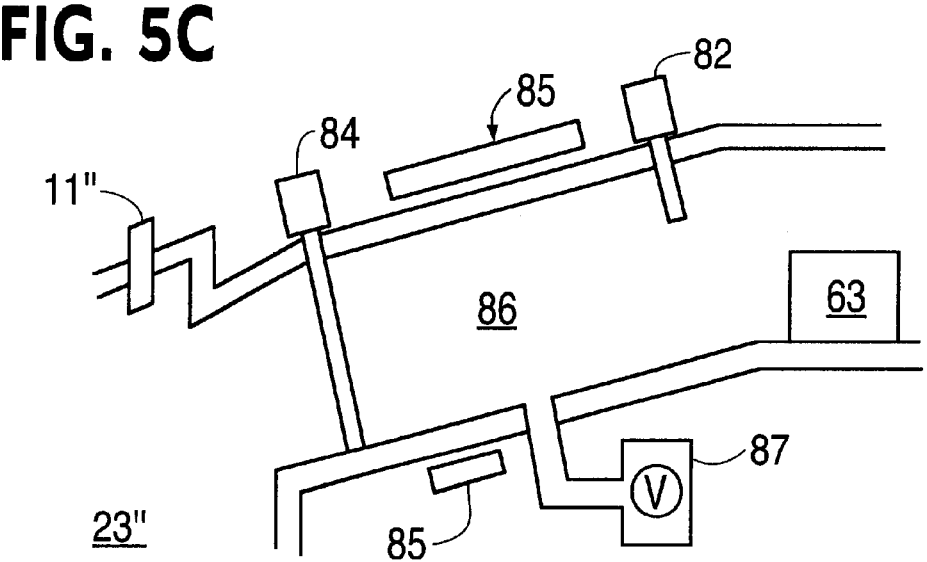
FIG. 5C is a side view of an embodiment of a loading system which includes a vacuum pump.

Alternatively, a vacuum pump, 87 shown in FIG. 5C can be attached in chamber 86, between doors 82 and 84. As the ingot 63 enters chamber 86, both doors 82, 84 are closed and the vacuum pump creates a near vacuum in chamber 86. Door 84 is then opened to release ingot 63 into melt tank 23" without allowing any air to enter melt tank 23" because chamber 86 was at vacuum when door 84 is opened.

Figure 5D:
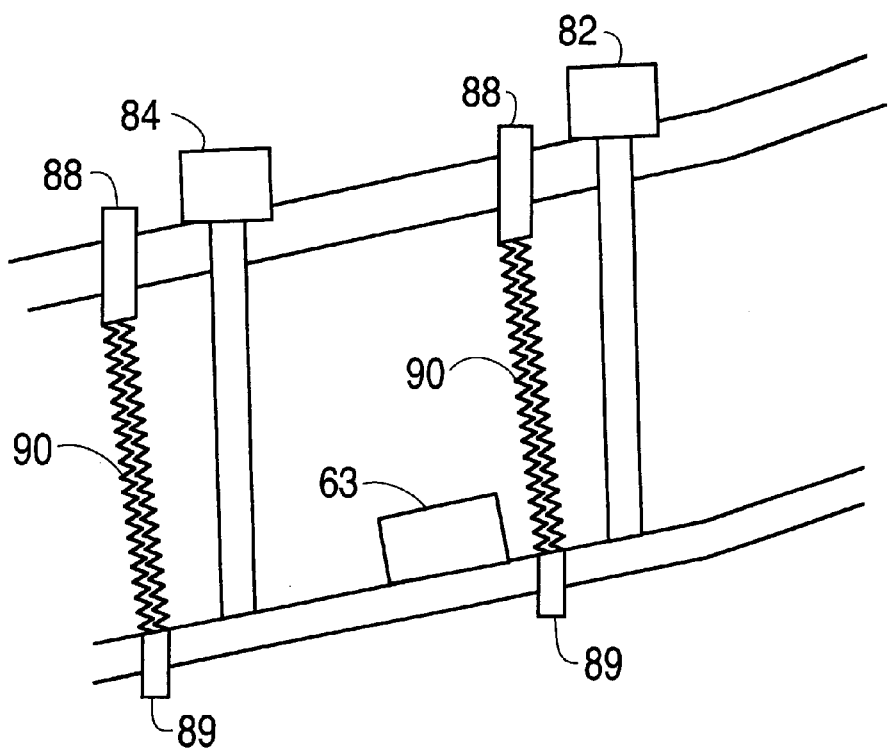
FIG. 5D is a side view of an embodiment of a loading system which includes inert gas screens.

As shown in FIG. 5D an inert gas screen 90 can be made to flow from inert gas source(s) 88 across the back of door 82 and/or 84 and out through optional suction pipes or vents 89. The inert gas screen 90 keeps air from entering chamber 86 and tank 23". The inert gas can comprise at least on gas selected from a group comprising argon, nitrogen, $CO_2$ and $SF_6$. The gas screen of FIG. 5D can be used in combination with vacuum pump of FIG. 5C to obtain the least air penetration into melt tank 23". The air control measures, such as melt tank gas port 11", doors 82, 84, vacuum pump 87 and inert gas screen(s) 90 are all used to prevent the introduction of air into the melt tank and/or the holding chamber to reduce the possibility of explosion.

Figure 5E:
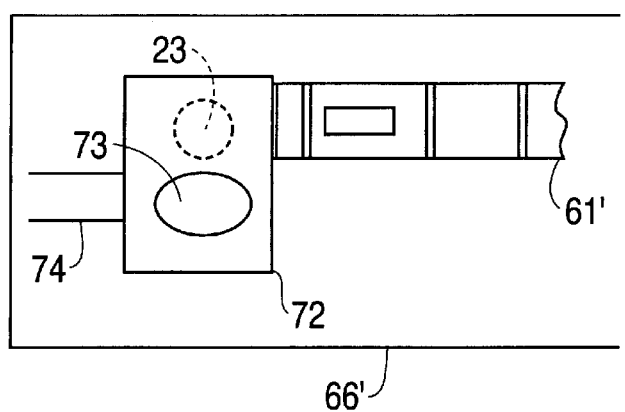
FIGS. 5E–H are top views of an alternative embodiment of a loading system used to load metal ingots into the apparatus of the present invention.
Figure 5F:
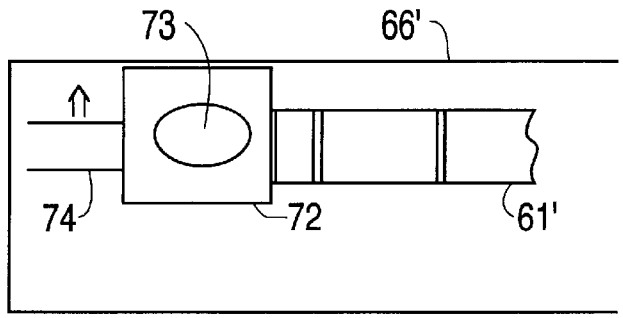

FIGS. 5E and 5F show an alternative loading system to that shown in FIGS. 5A. The holding chamber 66' utilizes a movable aperture plate 72. FIG. 5E shows a top view of the loading system where the access to the feeder 23 is closed. The movable aperture plate 72 contains an aperture 73 which is larger than an ingot. When no more ingots should be added to the feeder 23, the plate 72 is moved to one side by a movable arm 74 such that the plate covers the entrance to the feeder. As shown in FIG. 5F, when additional ingots should be added into the feeder 23, the plate 72 is moved to the other side, such that the aperture 73 corresponds to the opening to the feeder 23. This way, the ingots coming off the conveyor 61' pass through aperture 73 into the feeder 23. In the embodiment shown in FIGS. 5E and 5F the aperture plate 72 is utilized instead of a push arm 64 and piston 68 shown in FIG. 5B. However, the aperture cover plate 72 can be utilized in addition to the push arm 64 and piston 68. In this case, the plate 72 is blocks access to ingots sliding down sloped surface 67.

Figure 5G:
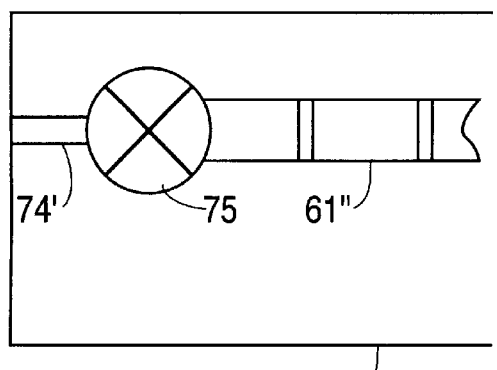
Figure 5H:
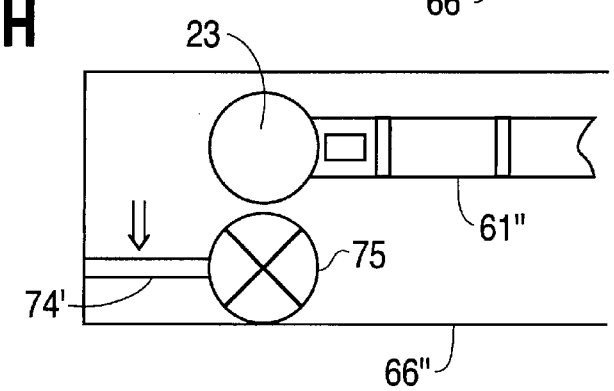

FIGS. 5G and 5H show an alternative loading system to that shown in FIGS. 5E and 5F. In this embodiment, the holding chamber 66" utilizes a movable cover plate 75 instead of a movable aperture plate 72. The cover plate 75 has a roughly circular shape which is sufficient to cover the opening to the feeder 23. FIG. 5G shows a top view of the loading system where the access to the feeder 23 is closed. A movable arm 74' moves the cover plate 75 over the opening to the feeder 23 to block access of ingots coming off conveyor 61". As shown in FIG. 5H, when additional ingots should be added into the feeder 23, the cover plate 75 is moved to the other side or raised up (out of the plane of the drawing), to expose the opening to the feeder 23. The ingots coming off the conveyor 61" can drop directly into the feeder 23. In the embodiment shown in FIGS. 5G and 5H the cover plate 75 is utilized instead of a push arm 64 and piston 68 shown in FIG. 5B. However, the cover plate 75 can be utilized in addition to the push arm 64 and piston 68.

Figure 5I:
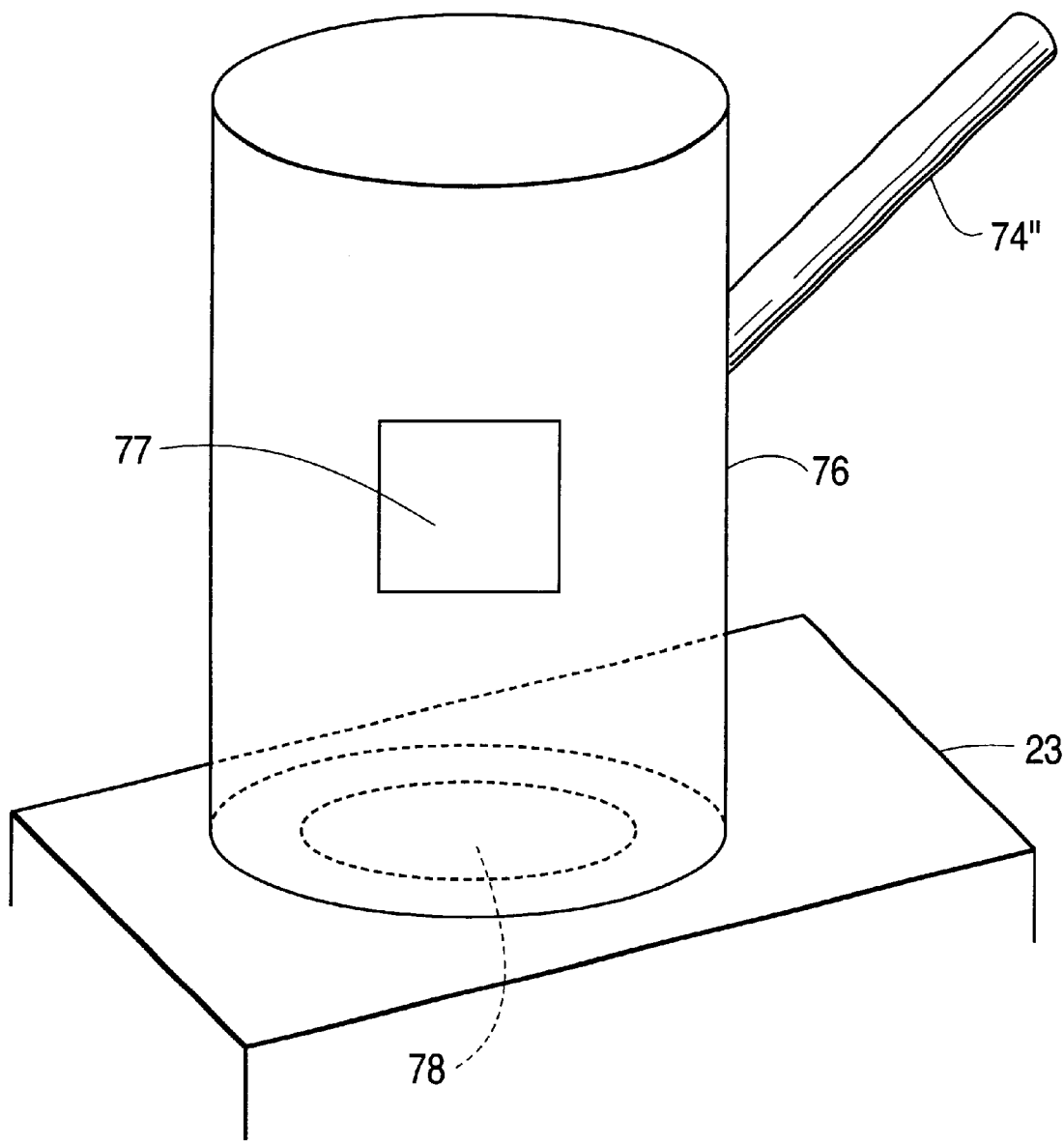
FIG. 5I is a three dimensional view of an alternative embodiment of a loading system used to load metal ingots into the apparatus of the present invention.
Figure 5J:
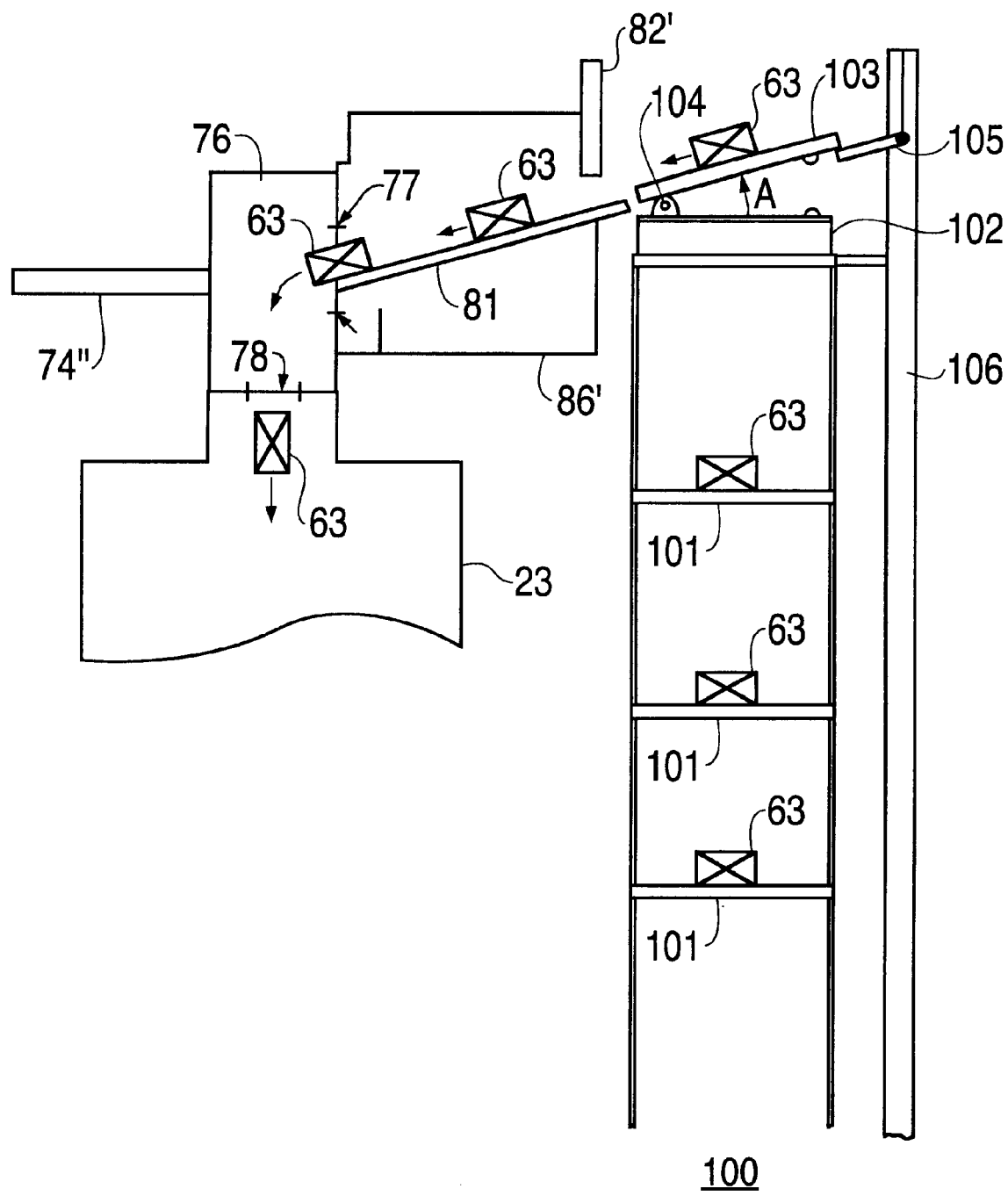
FIG. 5J is a side view of an elevator used to deliver the metal ingots to the conveyor of the loading system.

FIG. 5I shows an alternative loading system to that shown in FIG. 5A. The opening 78 to the feeder 23 is covered by a movable transfer chamber 76, such as a cylinder. Cylinder 76 has an aperture 77. Aperture 77 is at the same level as the conveyor 81', as shown in FIG. 5J. When ever it is desired to add more ingots 63 to the feeder 23, a movable arm 74" moves the cylinder into a position where the aperture 77 lines up with the end of the conveyor 81' to allow the ingots to fall from conveyor 81' through aperture 77 into cylinder 76 and down into the feeder 23 through opening 78. To close access to the feeder 23, movable arm 74" moves the cylinder 76 in any direction (e.g. up, to the left or to the right) such that the end of the conveyor is no longer aligned with the aperture 77. While transfer chamber 76 has been described as a cylinder, it may have any other shapes, such as a cube, etc. The transfer chamber may also be used with a push arm 64 and piston 68 shown in FIG. 5A. In this case, the ingots 63 would slide down the sloping surface 67 into the transfer chamber instead of dropping directly into the feeder 23. The transfer chamber 76 may also be used with the holding chamber 86 FIG. 5B. This is shown in FIG. 5J.

FIG. 5J shows elevator 100 which delivers the ingots to the conveyor 81' in the holding chamber 86'. As shown in FIG. 5B, the holding chamber 86 may have one or two doors (82,84). In FIG. 5J, only one door 82' is shown for clarity. The ingots are moved up toward the holding chamber 86' on elevator platforms 101. Each platform comprises a platform base 102 and a movable platform top 103 connected by at least one connector 104. As each platform reaches the top of the conveyor 81', a lifting member 105 moves up pole 106 and pushes up on the back end of the platform top 103. The back end of the platform top 103 is lifted above platform base 102 by the lifting member 105, which causes the ingot(s) 63 to slide off the platform top onto the conveyor 81'. The ingots 63 pass from the conveyor 81' into the feeder. The ingots 63 may optionally pass through the transfer chamber 76 shown in FIGS. 5I and 5J. After the ingot(s) are removed from the platform top, the lifting member moves down the pole 106, placing the platform top 103 onto the platform base 102. The lifting member 105 then disengages the first platform 101, the next platform 101 is moved up and the process is repeated.

Connector 104 may be a bolt which rotably connects platform top 103 and base 102. Preferably, the platform top is rotated up about 20 degrees by the lifting member 105.

Alternatively, the entire platform 101, and not just the platform top may be lifted by the lifting member. The elevator 100 may also be used with the holding chamber 66 shown in FIG. 5A and ingots may slide into the feeder 23 down sloped surface 67.

Preferably, the movement of the lifting member 105 is synchronized with the opening of the doors. For example, as the lifting member 105 moves up on the pole 106, the door 82' is simultaneously opened to allow the ingot 63 to pass into the holding chamber 86'. Furthermore, the cover plates 72 or 75 shown in FIGS. 5E–H or the transfer chamber 76 shown in FIG. 5I may also be synchronized with the door 82'. Thus, after the door 82' is closed, the cover plates or the transfer chamber may be moved to open access to the feeder 23. If back door 84 (shown in FIG. 5B) is also present, it should be opened after the front door 82' is closed. Elevator 100 may also be used with conveyor 61 and holding chamber 66 shown in FIG. 5A.

Figure 6:
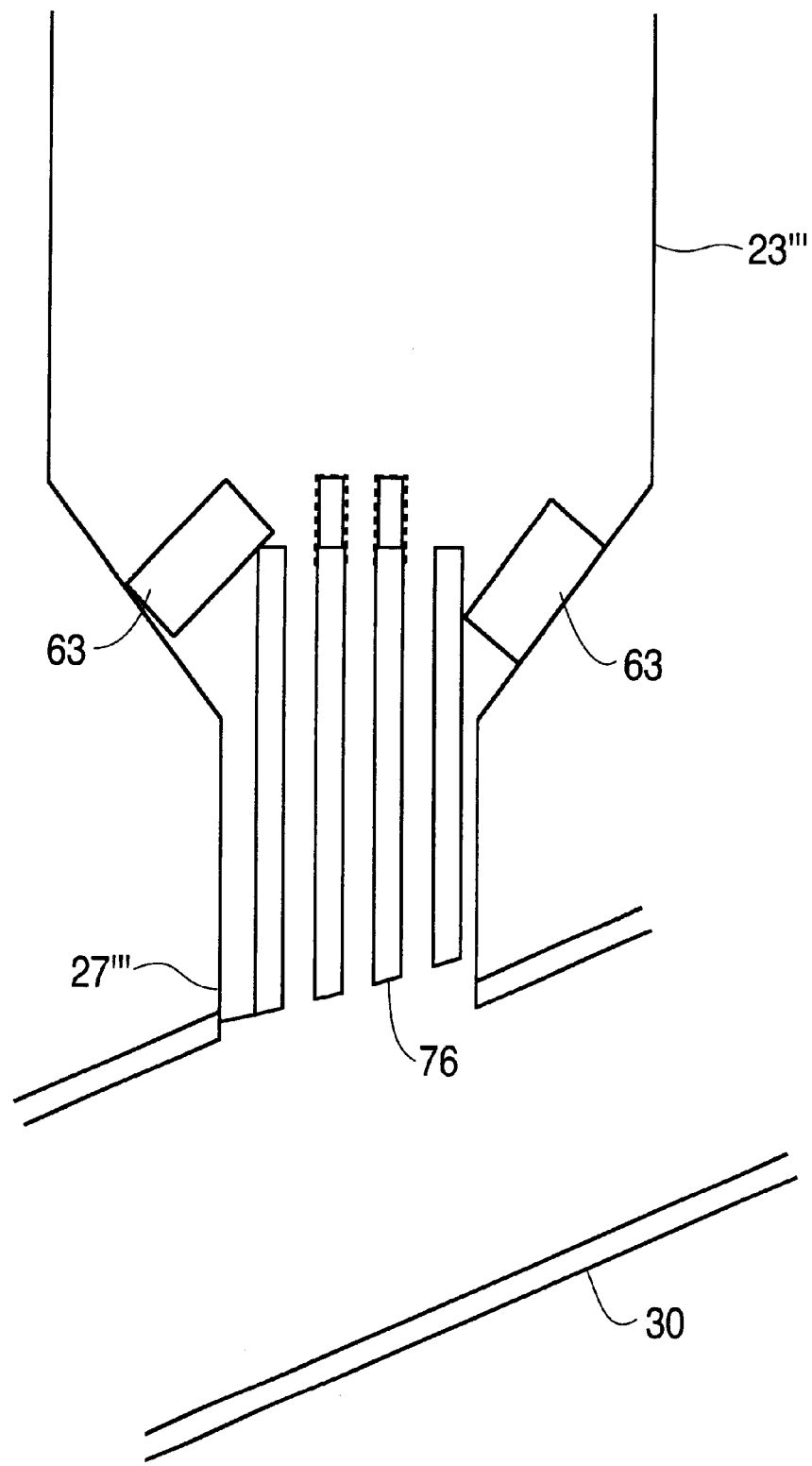
FIG. 6 is a side view of an embodiment of a feeder which utilizes substantially vertical outlet containment rods.

FIG. 6 shows another embodiment of a feeder 23 utilizing substantially vertical outlet containment rods. In FIG. 1 (as well as FIG. 5B) feeder port 27 was protected by a filter 24 is a shape of a grate. A grate is required to prevent unmelted metal pieces from exiting feeder 23 into the barrel 30 through feeder port 27. However, metal ingots 63 sink to the bottom of the feeder port and lie flat on the grate. This positioning is not desirable because the ingots may substantially block liquid metal flow through feeder port 27''' into the barrel 30. To prevent ingots from blocking the grate, outlet containment rods 76 should be utilized above the feeder port 27''' as shown in FIG. 5K. The rods may be of any shape as long as they prevent the sinking ingots 63 from laying flat across the feeder port 27''' and blocking it. For example, as shown in FIG. 6, the rods in the middle of the feeder port may rise above the rods near the circumference of the feeder port to force the ingots 63 to rest on their side toward the edge of the feeder 23''' while melting. Feed tank 23''' may also have a lower region with a bottom surface that is at a lower position than the feeder port 27''', as shown in FIG. 3. The sinking ingots which come in contact with rods 76 will be deflected sideways into the lower region. The ingots will melt in the lower region without blocking the feeder port 27'''.

Figure 7A:
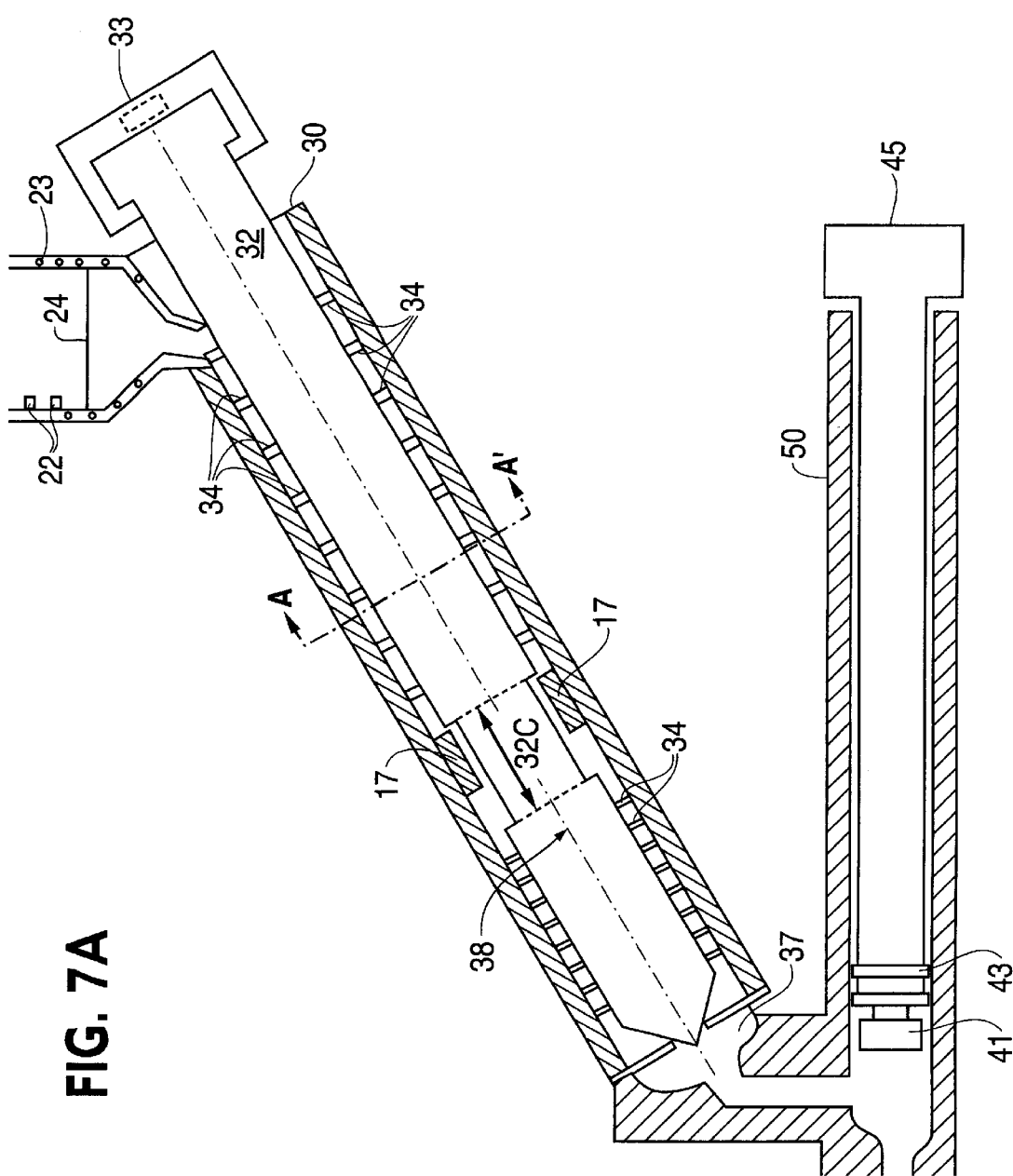
FIG. 7A is a schematic illustration of a side view of the injection molding system according to an embodiment of the invention which contains supporting fins around the ram.

FIG. 7A shows a side view of an alternative embodiment of the invention having supporting ribs or fins 34 arranged on ram 32. The Figure is not to scale and the barrel 30 thickness has been exaggerated for clarity. The heaters 70 are present but have been omitted from the Figure for clarity. The fins 34 are preferably attached to the ram 32 and can slide on the inner circumference of the barrel 30, both coaxially with the length of the barrel and/or in a circular motion about the barrel axis 38. The movement produces a rotation of the fins 34 around the inner circumference of the barrel 30. Alternatively, the fins 34 may be attached to the inner circumference of the barrel 30 in such a manner as to allow the bare ram 32 to slide by. The fins 34 can be made of the same material as the ram 32 or form a different material that can withstand the required process temperatures. The purpose of the fins is two fold. The first purpose is to prevent the ram 32 from tilting and wobbling away from the barrel axis 38. Since the ram 32 is fairly long, without the fins 34 it has a tendency to tilt. The unsupported front part of the ram comes closer to the bottom part of the interior barrel surface than to the top interior barrel surface under the weight of gravity. Fins 34 prevent ram from tilting and wobbling by making contact with the inner surface of the barrel 30, thus keeping the ram 32 centered and aligned with the axis of the barrel. The second purpose is to enhance the uniform temperature distribution of the melted metal.

Figure 7B:
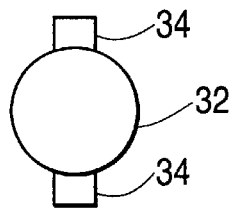
FIGS. 7B–G are cross sectional and three dimensional views of specific arrangements of the support fins.
Figure 7C:
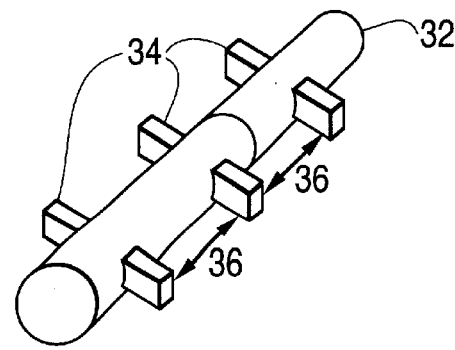
Figure 7D:
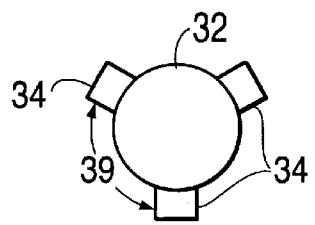
Figure 7E:
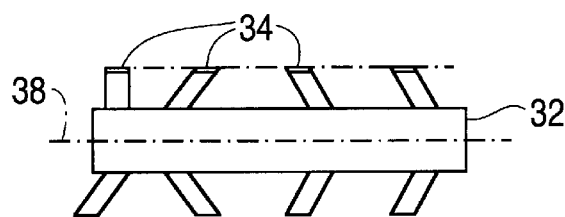
Figure 7F:
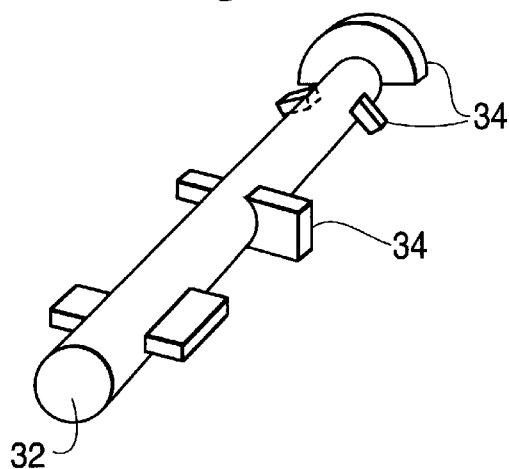
Figure 7G:
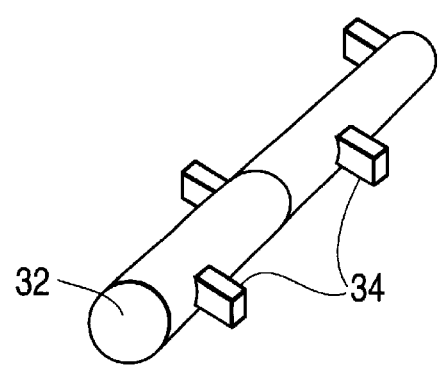

As shown in FIG. 7A, there are no fins in area 32c of the ram that moves inside valve 17 so as not to strike the valve. The cross sectional view across section A–A' in FIG. 7A is shown in FIG. 7B. As can be seen, the fins 34 do not extend around the entire circumference of the ram 32 to allow the metal to flow through the barrel. The fins 34 can be arranged in a number of different formations around ram 32. For example, as shown in FIG. 7C, two fins can be arranged on opposite sides of the rod at periodic intervals 36. Each interval can be of the same or different length. For example, the fins can be spaced closed to each other on one end of the ram than on another end of the ram, or the fins can be spaced closer together in one or more sections nearer to the middle of the ram than one or both ends of the ram. Alternatively, as shown in FIG. 7D, more than two fins (e.g. three) can be arranged around the ram at spaced intervals 39. Again, the intervals along the ram 36, and intervals around the circumference of the ram 39 can be of the same or different length. Furthermore, the fins 34 can be tilted at one or more angles other than 90 degrees with respect to the axis of the barrel, as shown in FIG. 7E. Otherwise, some fins 34 may be tilted at 90 degrees while other fins at an angle other than 90 degrees. As noted above, there can be more than two tilted fins spaced along the rod at equal or unequal intervals. Still further, the width and/or thickness of the fins along the ram and/or around the ram circumference the may differ, as shown in FIG. 7F. The fins may also be staggered about the length of the ram, as shown in FIG. 7G. In general any combination of one of more of the above alternative arrangements are possible, even if the fins 34 are mounted on the inside of the barrel 30 rather than on the ram 32. The ram 32 with fins 34 may be also be used with the embodiments shown in FIGS. 3–5.

Figure 8A:
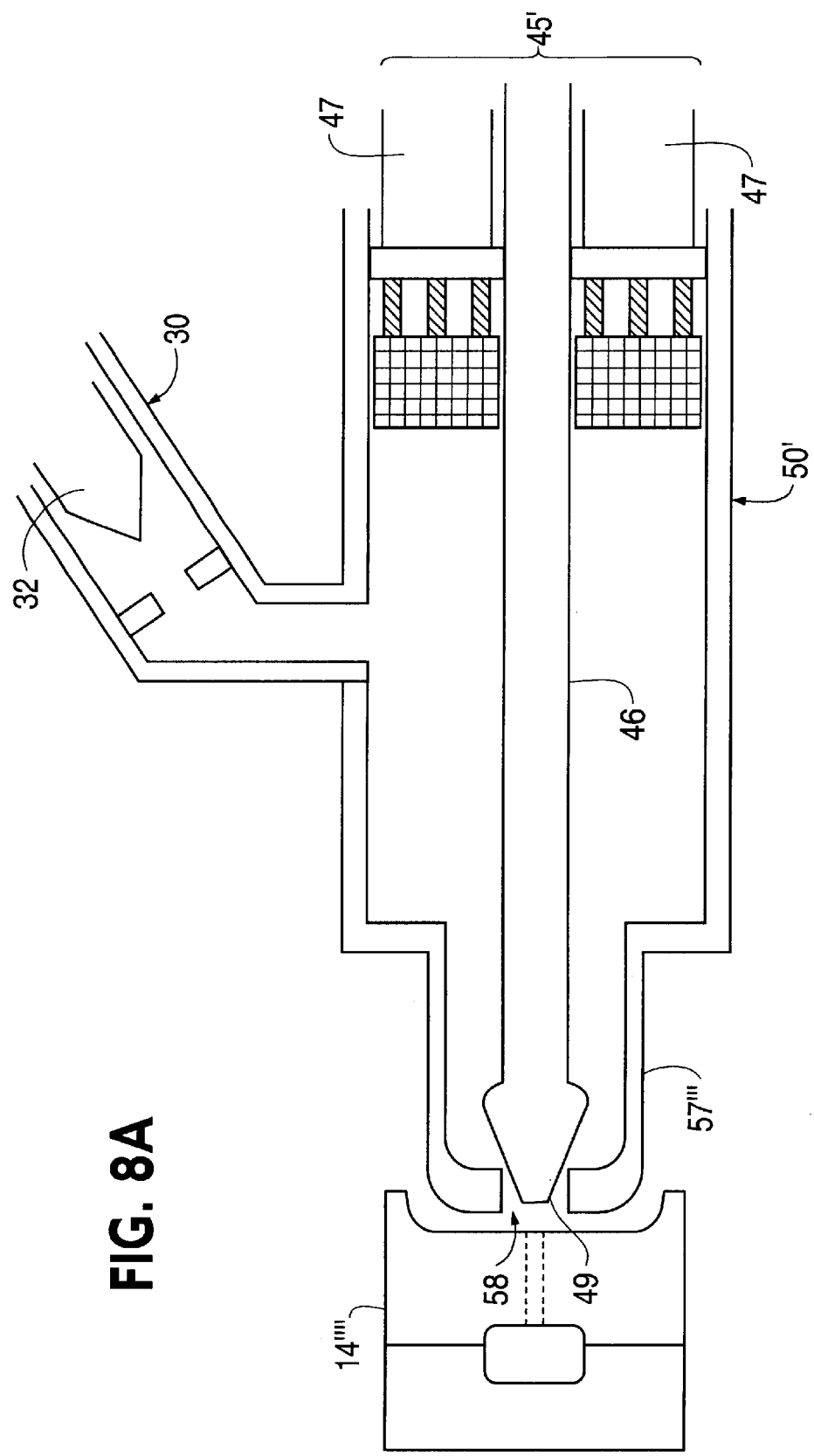

FIGS. 8A–D show side views of another embodiment of the injection chamber 50'. In this embodiment, the piston 45' is composed of two parts: an inner part 46 and an outer part 47. The outer part is substantially a hollow cylinder and the inner part is substantially a cylinder which slidably fits inside the outer part. The two parts have separate drive mechanisms. FIG. 8A shows the situation when the ram 32 is retracted back in the barrel 30 to allow metal to flow into injection chamber 50'. The inner part 46 of the piston is fully extended to block the exit 58 from the injection nozzle 57''' to prevent metal flow into the die 14''''. The outer part 47 of the piston is retracted to expand the volume of the injection chamber 50' to a desired volume. Likewise, the ram 32 is retracted in the barrel 30. In this configuration, metal flows into injection chamber 50' from barrel 30' but does not prematurely flow into the die through injection nozzle aperture 58 because it is blocked by inner piston part 46. The heating elements 70 are present but are omitted from the Figure for clarity.

Figure 8B:
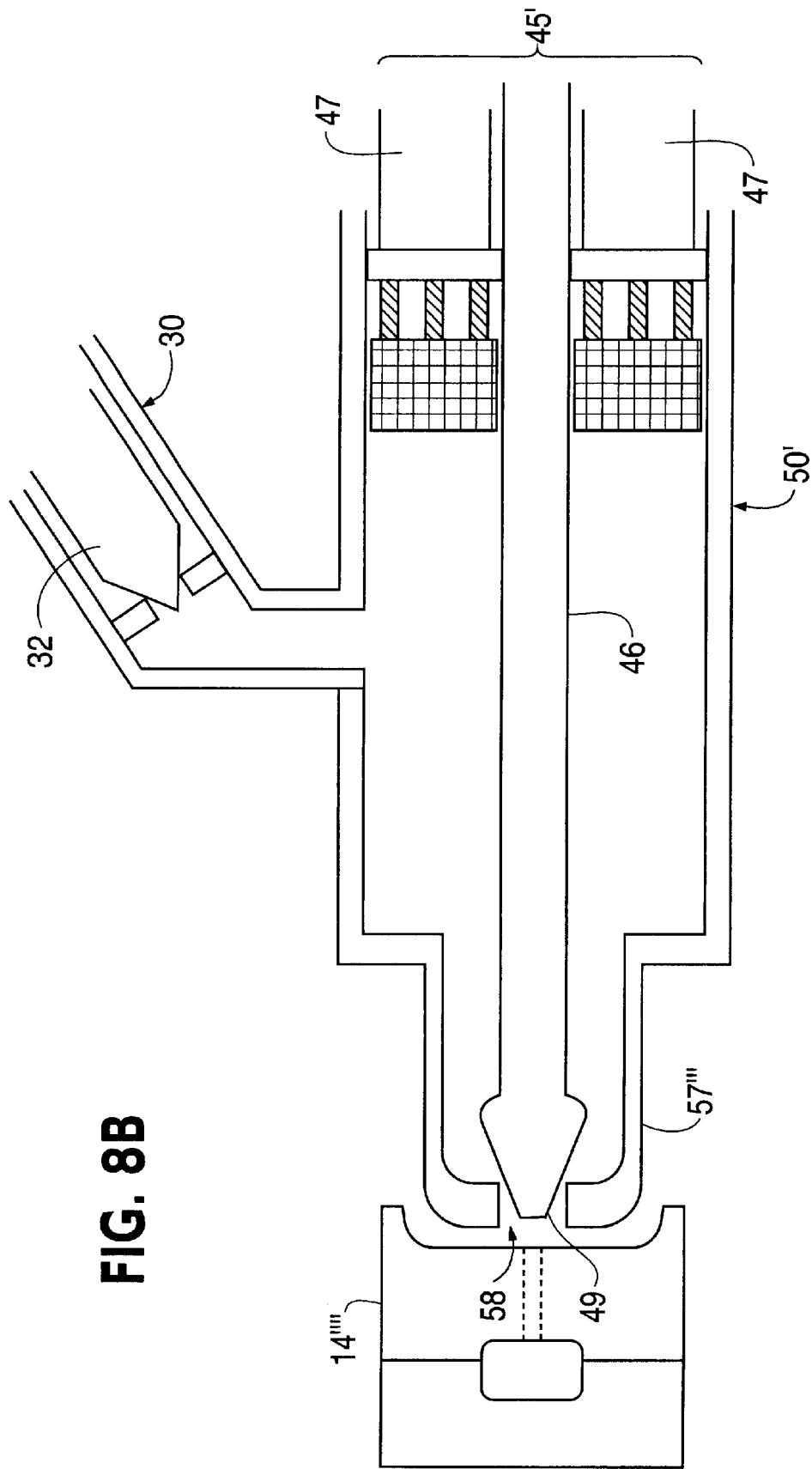

FIG. 8B shows the next step in the operation of the injection chamber 50'. Here, ram 32 is fully advanced inside the barrel 30 to advance the remaining metal from barrel 30 to injection chamber 50'. The inner piston part 46 is still fully advanced to block the injection nozzle aperture 58. The outer piston part 47 is still retracted to allow metal to flow from barrel 30 into injection chamber 50'. This configuration also prevents premature flow of the metal into the die.

Figure 8C:
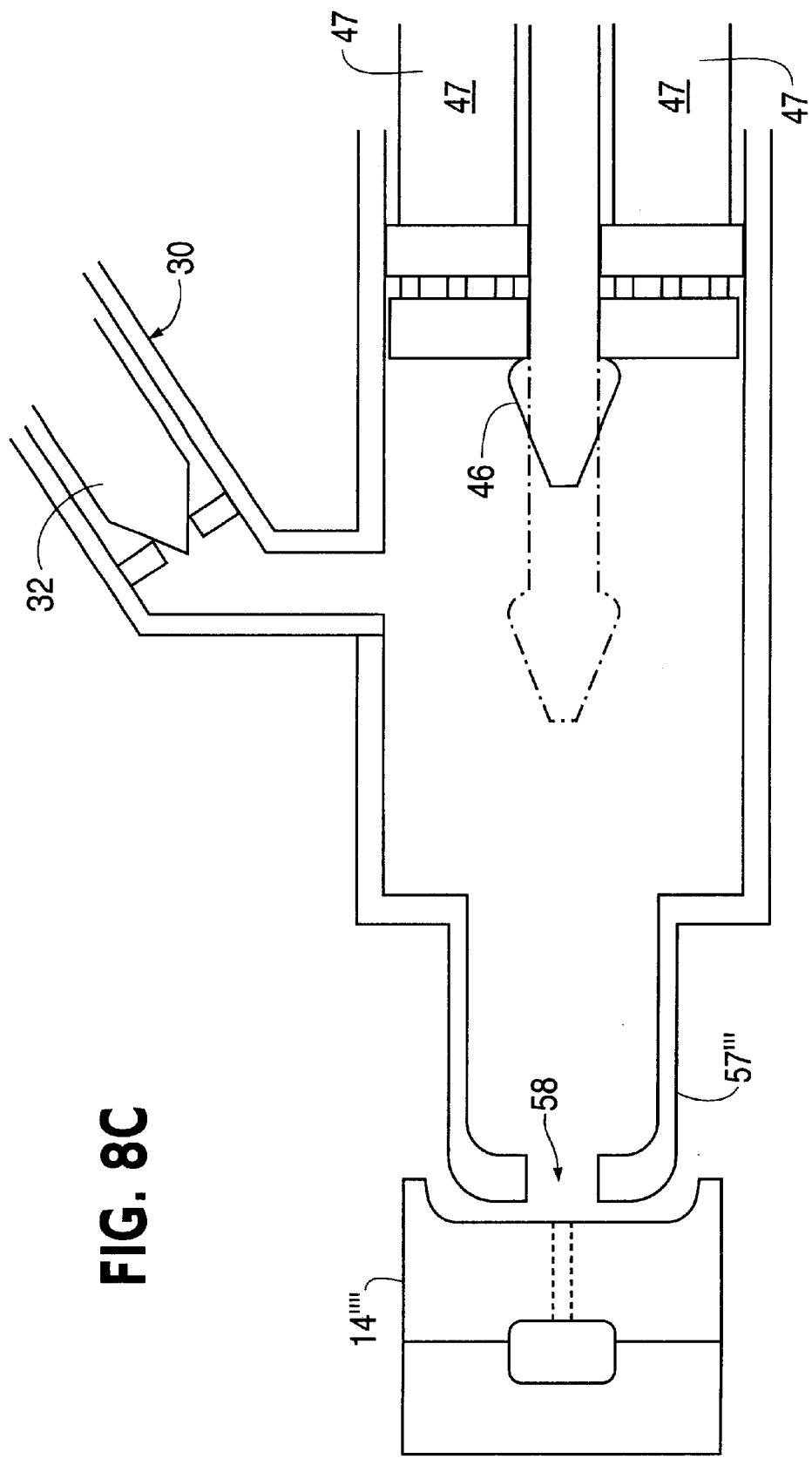

FIG. 8C shows the next step in the operation of the injection chamber 50'. The inner piston part 46 has been retracted into the outer piston part 47. The injection nozzle is now open. However, no extra metal flows from barrel 30 into injection chamber 50' because barrel opening is blocked by the advanced ram 32.

FIG. 8D shows the last step in the operation of the injection chamber 50'. Both the inner and outer parts 46,47 of the piston 45' are pushed to the left to force the melted metal in the injection chamber 50' into the die 14'''' through the injection nozzle 57'''. As described above, the injection nozzle 57''' may be moved forward to contact the opening in the die prior to moving the piston 45' to the left.

After the step shown in FIG. 8D, the ram 32 and the outer piston part 47 are retracted, while the inner piston part 46 is positioned to block the injection nozzle aperture 58, as shown in FIG. 8A, and the process is repeated as necessary.

Alternatively, the inner piston part 46 may be retracted partially into the outer piston part 47, (shown as dashed lines in FIG. 8C) to allow metal into the die opening, instead of being retracted all the way in as shown in FIG. 8C. Furthermore, the inner piston part 46 may move into the injection nozzle 57''' and further to the left (shown as dashed lines in FIG. 8D) than the outer piston part 47 instead of moving as far left as the outer piston part 47, as shown by the solid line in FIG. 8D. Thus, the nozzle shut-off plate may be replaced by the inner piston part 46, since both perform the same function. Thus, the apparatus of FIGS. 8A–D is an improvement on the apparatus of FIG. 1 because it requires only one motor to move the two part piston instead of two motors required in FIG. 1 (one to operate the piston and the other to operate the shut-off plate).

Furthermore, the apparatus shown in FIGS. 8A–D prevents metal accumulation in the nozzle aperture and allows the inner piston part 46 to force the melted metal in the injection nozzle 57''' into the die opening. Without the two part piston, the melted metal may accumulate in the prior art injection nozzle even after the injection motion by the piston, and solidify as a plug 91, as shown in FIG. 9. The plug 91 forms in the exit aperture 92 of the injection nozzle 90 because the tip 93 of the nozzle comes in contact with the cooler walls of the die (or die support walls) 94. Therefore, the nozzle tip is at a lower temperature than the rest of the injection chamber. Such plugs are undesirable because they block egress from the injection nozzle, thus decreasing the amount of metal injected into the mold or rendering the apparatus inoperative.

However, the inner portion of the piston 46 in FIGS. 8A–D blocks the injection nozzle aperture from the inside of the nozzle prior to piston injection movement, thus preventing any metal from accumulating in the aperture. In addition, the inner piston portion may be designed to push out any residual metal that may accumulate in the aperture by including a tapered tip 49 of the inner piston portion 46 that extends into the aperture, as shown in FIG. 8A.

Figure 10:
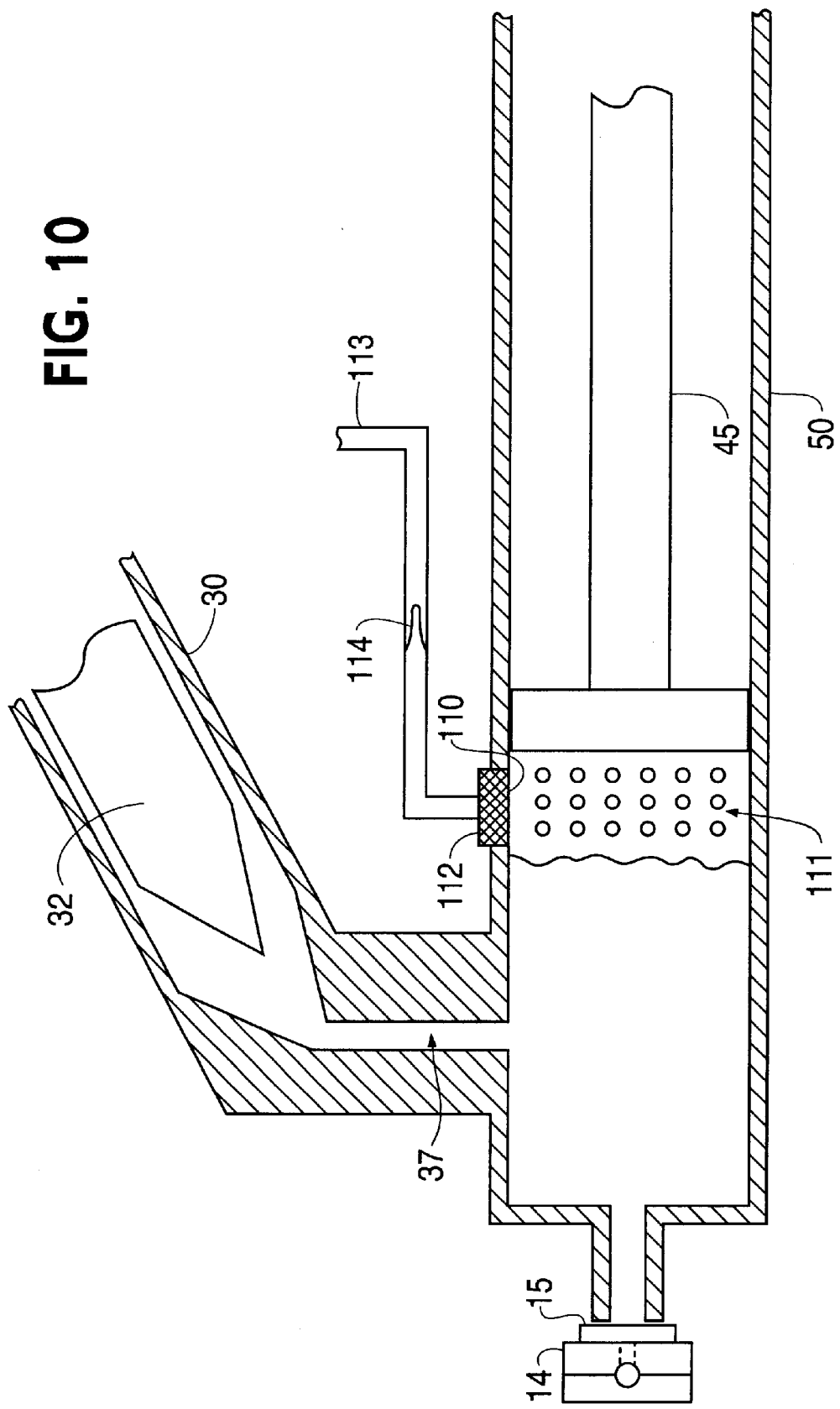
FIG. 10 is a side view of an embodiment of an injection chamber with includes an outlet port.

FIG. 10 shows another embodiment of the present invention. In this embodiment, an extra gas outlet port 110 is added. The extra gas outlet port allows the gas 111 that is trapped between the melted metal 115 and the piston 45 to escape the injection chamber. The use of outlet port 110 in addition to the opening around the piston allows more gas to escape the injection chamber. Alternatively, the outlet port 110 can comprise the only means for the trapped gasses to escape. The outlet port 110 is preferably positioned between the inlet to the injection chamber and the position of the retracted piston. The outlet port can comprise any structure which would allow the gasses trapped in the injection chamber to escape, without letting in the air from outside of the apparatus into the injection chamber and without letting the melted metal escape through it during injection into the mold. For example, the outlet port 110 can contain a semi-permeable material, such as porous ceramic 112. The porous material allows gas, but not melted material to pass through it. The outlet port can be connected to an outlet pipe 113, which contains a one way valve 114 which allows gasses to escape, but which prevents outside air from entering the injection chamber.

FIGS. 11A and 11B show an alternative method of operating the piston. Prior to injecting the melted metal 115 into the mold 14, the piston is partially advanced forward, while the nozzle shut-off plate 15 blocks metal flow into the mold. The forward movement of the piston forces the trapped gasses out of the injection chamber. The gasses exit through the space between the piston and the injection chamber wall and through the outlet port 110, if present. However, the forward movement of the piston does not result in the injection of the melted metal into the mold because the nozzle shut-off plate blocks the nozzle. Once the trapped gasses are squeezed out of the injection chamber, the shut-off plate is lifted and the piston is advanced forward to inject the metal into the mold, as shown in FIG. 11B.

If the two part piston shown in FIGS. 8A–D is used, then a similar gas squeeze out method can be used. With the inner portion of the two part piston blocking the injection nozzle, the outer portion is partially advanced forward to squeeze the trapped gasses out of the injection chamber. Then, as the inner portion of the piston is retracted, the injection nozzle is opened and the piston is advanced forward to inject the metal into the mold.

Figure 12A:
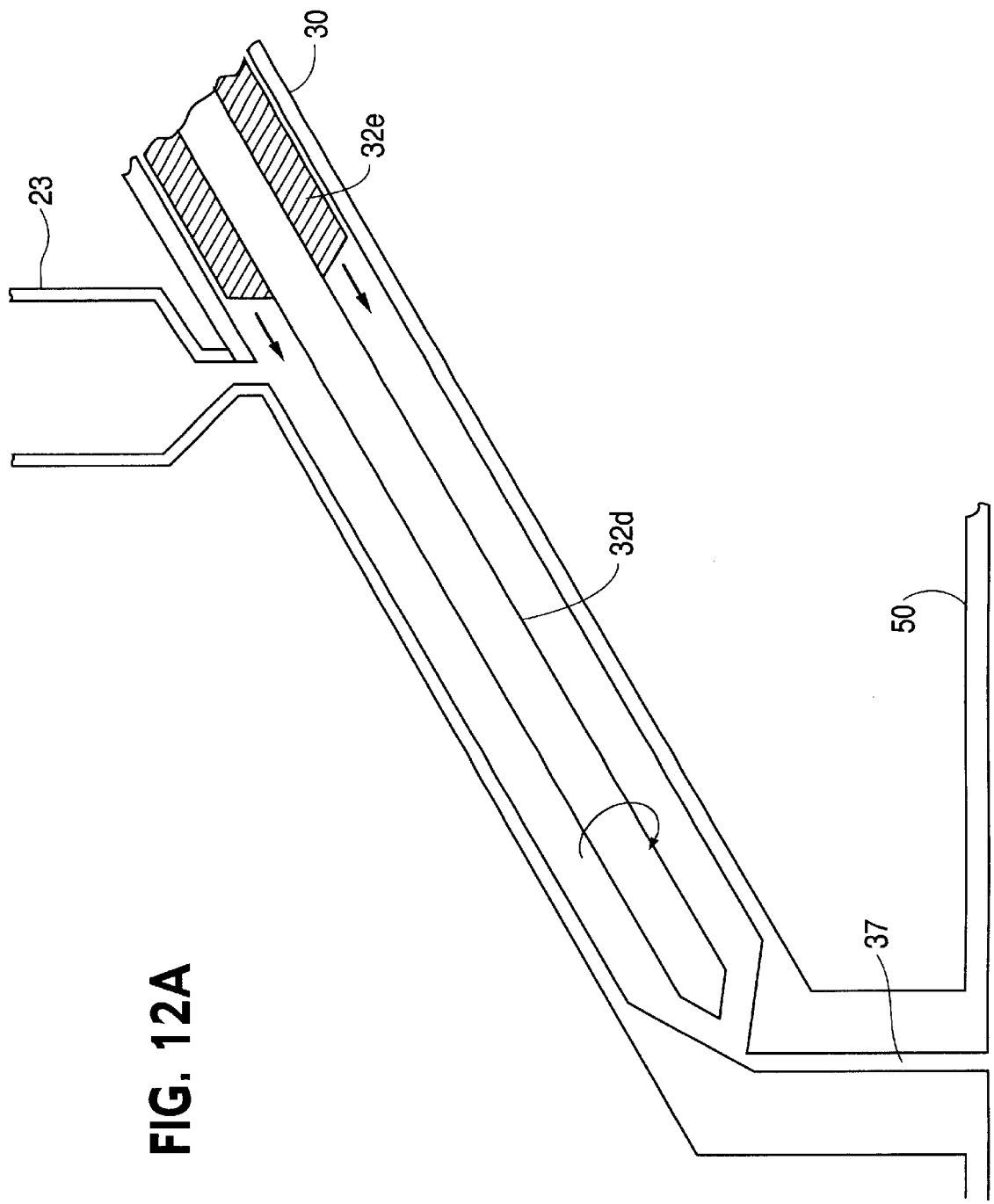
FIGS. 12A–B are side views of an embodiment of a barrel which includes a two part ram.
Figure 12B:
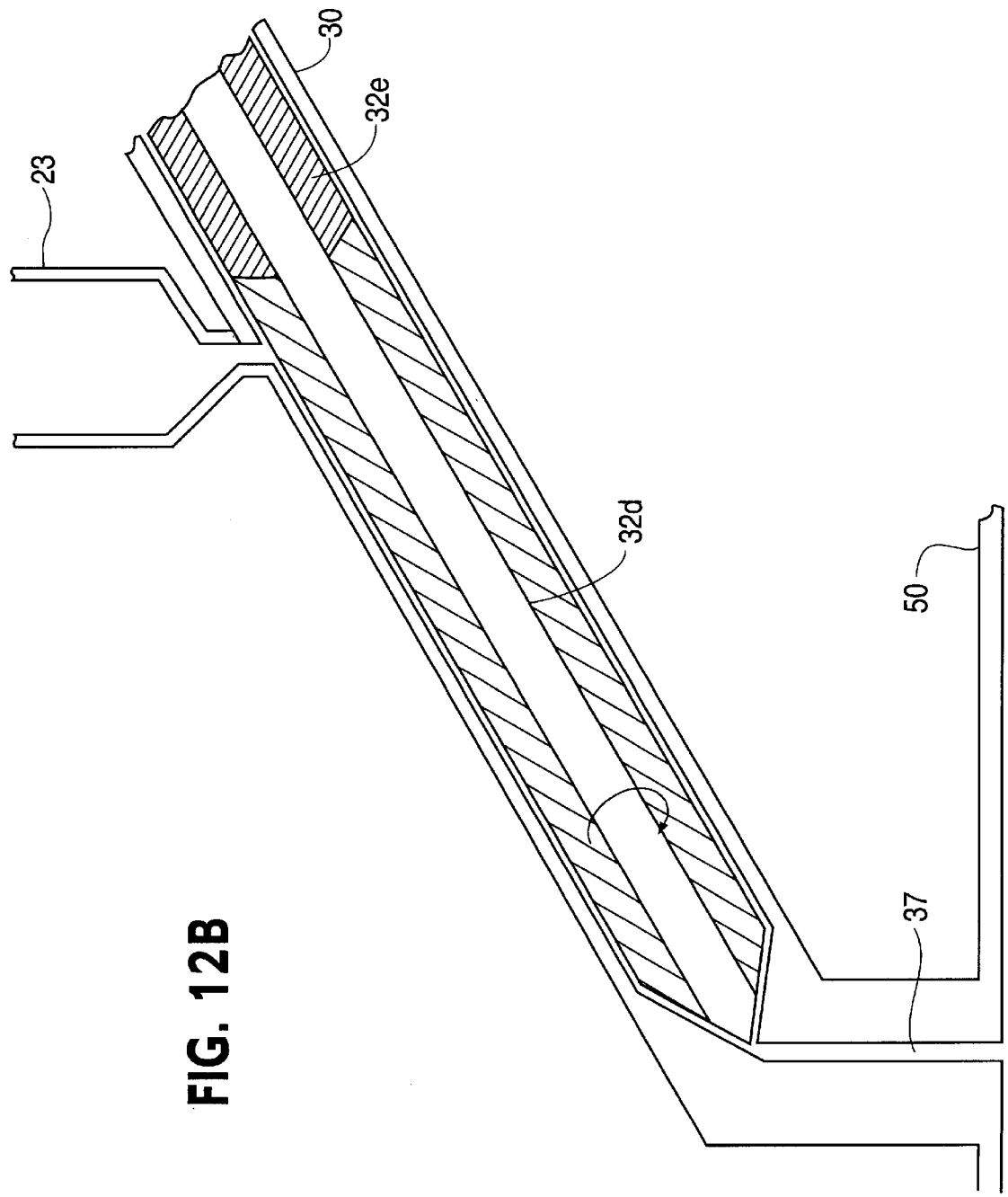

FIG. 12A shows another embodiment of the barrel according to the present invention. In this embodiment, the ram is composed of two parts, an inner portion 32d and an outer portion 32e. The outer portion 32e is slidably mounted on the first portion 32d and can be advanced and retracted along the axis of the barrel 30. The inner portion 32d is roughly circular in cross section, whole the outer portion 32e has a doughnut shape cross section, with an inner diameter slightly larger than the diameter of the inner portion 32d. The two part ram operates on a principle similar to the two part piston shown in FIGS. 8A–D. After each injection cycle, the inner ram portion 32d is partially retracted, while the outer ram portion 32e is fully retracted. As the melted metal flows from the feeder 23 through the barrel 30 and into the injection chamber 50, the inner portion of the ram 32d is extended down the length of the barrel and rotates about its axis to keep the temperature of the melted metal uniform. The outer portion 32e is then advanced forward to push the melted metal in the barrel into the injection chamber. Prior to the injection of the metal from the injection chamber to the mold, access to the barrel through the outlet port 37 must be closed. This can be accomplished by blocking the outlet port 37 with the end of the inner portion of the ram 32b or by blocking the outlet port 37 with both portions of the ram. The shape of the outlet port 37 can correspond to the tip of the composite two part ram such that when both portions of the ram are fully advanced, they are capable of blocking the outlet port 37, as shown in FIG. 12B. When the outer portion 32e is fully advanced, it substantially blocks the inlet to the barrel 30 from the melt feeder 23, such that substantially no melted metal enter the barrel 30 when the outer ram portion is fully advanced.

It is important to note that all embodiments shown in FIGS. 1–12 may be used together or separately or in any combination or permutation without departing from the scope of the current invention. In other words, any one or more improvements shown in FIGS. 2–8 may be added to the basic apparatus shown in FIG. 1 without departing from the scope of the current invention.

This application claims priority of U.S. provisional application Ser. No. 60/080,078 (filed on Mar. 31, 1998), the entire contents of which is incorporated.

While particular embodiments according to the invention have been illustrated and described above, it will be clear that the invention can take a variety of forms and embodiments within the scope of the appended claims. For example, a variety of metals can be processed using the method and apparatus of the present invention in the thixotropic state by an adjustment of the temperature profile.

What is claimed is:

1. An apparatus for injecting melted material into a mold, comprising
   a first chamber which holds melted material,
   a ram that moves through said first chamber to force at least a portion of the melted material from the first chamber through an outlet port leading into a second chamber,
   at least one heating element adjacent the second chamber to maintain the melted material in a semi-solid state in at least the second chamber;
   and a means for drawing in by suction comprising a piston in the second chamber that
   (a) retracts to create suction that assists in drawing into the second chamber at least a portion of the melted material through the outlet port from the first chamber; and that
   (b) advances to inject the melted material into a mold.

2. The apparatus as claimed in claim 1, wherein the first chamber includes a valve at one end that permits melted material to pass only in a direction toward the outlet port.

3. The apparatus as claimed in claim 1, wherein the ram contains supporting fins.

4. The apparatus as claimed in claim 1, further comprising heating elements adjacent the first chambers to regulate temperatures therein.

5. The apparatus as claimed in claim 1, further comprising an open nozzle at one end of the second chamber through which the melted metal is injected into a mold.

6. The apparatus as claimed in claim 5, further comprising a nozzle shut-off plate which covers the nozzle and moves longitudinally to permit the nozzle to engage a mold during injection.

7. The apparatus as claimed in claim 6, further comprising a heating element in contact with the nozzle shut-off plate.

8. The apparatus as claimed in claim 1, wherein the first chamber is positioned above the second chamber.

9. The apparatus as claimed in claim 1, wherein the first chamber is inclined at an angle between 30 and 60 degrees with respect to the second chamber.

10. The apparatus as claimed in claim 1, wherein the second chamber comprises at least one gas outlet port.

11. The apparatus as claimed in claim 10, wherein the gas outlet port comprises at least one of
   a) a void between the piston and the walls of the second chamber;
   b) a seal surrounding the piston; and
   c) an opening in the wall of the second chamber connected to a gas permeable but liquid resistant material.

12. The apparatus as claimed in claim 1, comprising
   a feeder connected to the first chamber by a feeder port; and at least one heating element for the feeder.

13. The apparatus as claimed in claim 12, comprising a third chamber in communication with the feeder.

14. The apparatus as claimed in claim 13, wherein the third chamber comprises
   a push arm to push metal ingots into the third chamber; and
   a sloping surface to assist passage of the metal ingots into the feeder.

15. The apparatus as claimed in claim 13, comprising an inert gas introduction nozzle in at least one of the feeder and the third chamber.

16. The apparatus as claimed in claim 13, wherein the third chamber comprises a movable cover plate.

17. The apparatus as claimed in claim 16, wherein the movable cover plate comprises an access aperture.

18. The apparatus as claimed in claim 12, comprising a movable transfer chamber containing an access aperture.

19. The apparatus as claimed in claim 13, comprising an elevator for delivering metal ingots; and a conveyor for transferring the metal ingots from the elevator to the third chamber.

20. The apparatus as claimed in claim 19, wherein the elevator comprises
   at least one rotatable platform;
   at least one connector about which the platform rotates; and
   a lifting member which lifts up the platform causing it to rotate about the connector.

21. The apparatus as claimed in claim 12, wherein the feeder contains a filter to prevent solid material from entering the first chamber.

22. The apparatus as claimed in claim 21, wherein the filter comprises a grate or at least one vertical rod.

23. The apparatus as claimed in claim 1, wherein the piston comprises an outer portion and an inner portion and wherein the inner portion is moved independently of the outer portion to prevent material flow through an injection nozzle into the mold.

24. The apparatus as claimed in claim 1, wherein the ram comprises an outer portion and an inner portion and wherein the inner portion is moved independently of the outer portion.

25. An apparatus for injecting melted material into a mold, comprising
   a passing means for passing the melted material;
   forcing means for forcing at least a portion of the melted material from the passing means into an accumulation means for accumulating melted material;
   suction means for creating a suction in the accumulating means to draw at least a portion of the melted material from the passing means into the accumulating means;
   heating means for maintaining the melted material in a semi-solid state in at least the second chamber;
   injection means for injecting the melted material from the accumulation means into the mold.

26. The apparatus as claimed in claim 25, comprising means which permit passage of the melted material only in a direction toward the accumulation means.

27. The apparatus as claimed in claim 25, comprising heating means for heating said accumulation means.

28. The apparatus as claimed in claim 25 comprising means to cover an injection nozzle in the accumulating means.

29. The apparatus as claimed in claim 25 comprising egress means for removing at least one gas from the accumulation means.

30. The apparatus as claimed in claim 25, comprising melting means for melting a solid material to form the melted material.

31. The apparatus as claimed in claim 30, comprising filtering means for preventing entry of the solid material into the passing means.

32. The apparatus as claimed in claim 30, comprising holding means for holding the solid material prior to its introduction into the melting means so as to maintain an inert gas ambient in the melting means.

33. The apparatus as claimed in claim 32, comprising transfer means for transferring solid material into the holding means.

34. The apparatus as claimed in claim 33, wherein said transfer means is synchronized with a door to the holding means to transfer the solid material into the holding means when the door is opened.

\* \* \* \* \*